United States Patent [19]

Gardner et al.

[11] Patent Number: 4,688,594

[45] Date of Patent: Aug. 25, 1987

[54] BUTTERFLY VALVE ASSEMBLY AND METHOD OF MAKING SAME

[75] Inventors: John F. Gardner, Loveland; Gerald H. Morton, Cincinnati, both of Ohio

[73] Assignee: Xomox Corporation, Cincinnati, Ohio

[21] Appl. No.: 779,269

[22] Filed: Sep. 23, 1985

Related U.S. Application Data

[63] Continuation-in-part of Ser. No. 549,200, Nov. 4, 1983, Pat. No. 4,542,763.

[51] Int. Cl.[4] .............................................. F16K 49/00
[52] U.S. Cl. .................................. 137/340; 251/144; 29/157.1 R
[58] Field of Search ........................ 137/340; 251/144; 29/157.1 R

[56] References Cited

U.S. PATENT DOCUMENTS

| 2,884,959 | 5/1959 | Neely | 137/340 |
|---|---|---|---|
| 3,557,823 | 1/1971 | Carr | 137/340 |
| 3,941,186 | 3/1976 | Schneider | 137/340 |
| 4,559,967 | 12/1985 | Gardner et al. | 137/340 |

Primary Examiner—A. Michael Chambers
Attorney, Agent, or Firm—Kinney & Schenk

[57] ABSTRACT

A butterfly valve assembly and method of making the same are provided wherein such valve assembly has a valve body structure and a closure structure and is provided with a new device for locking, in its closed position, a shaft assembly which is used to operate the closure structure. In accordance with another feature of the invention a new butterfly valve and method of making same are provided wherein such butterfly valve has new heat exchange devices comprising same for controlling the temperature thereof.

19 Claims, 30 Drawing Figures

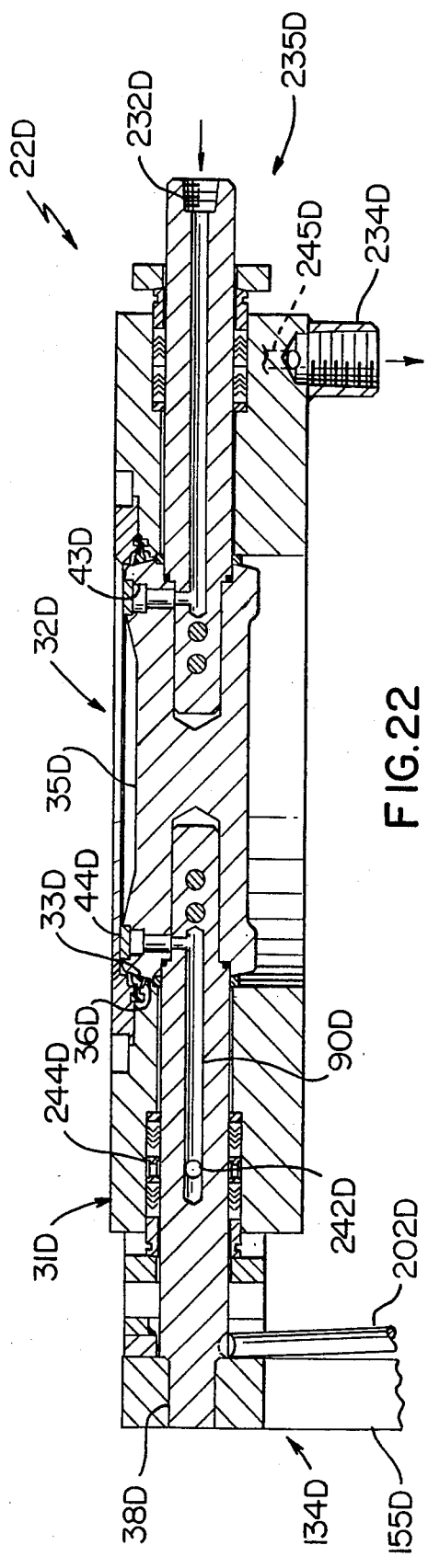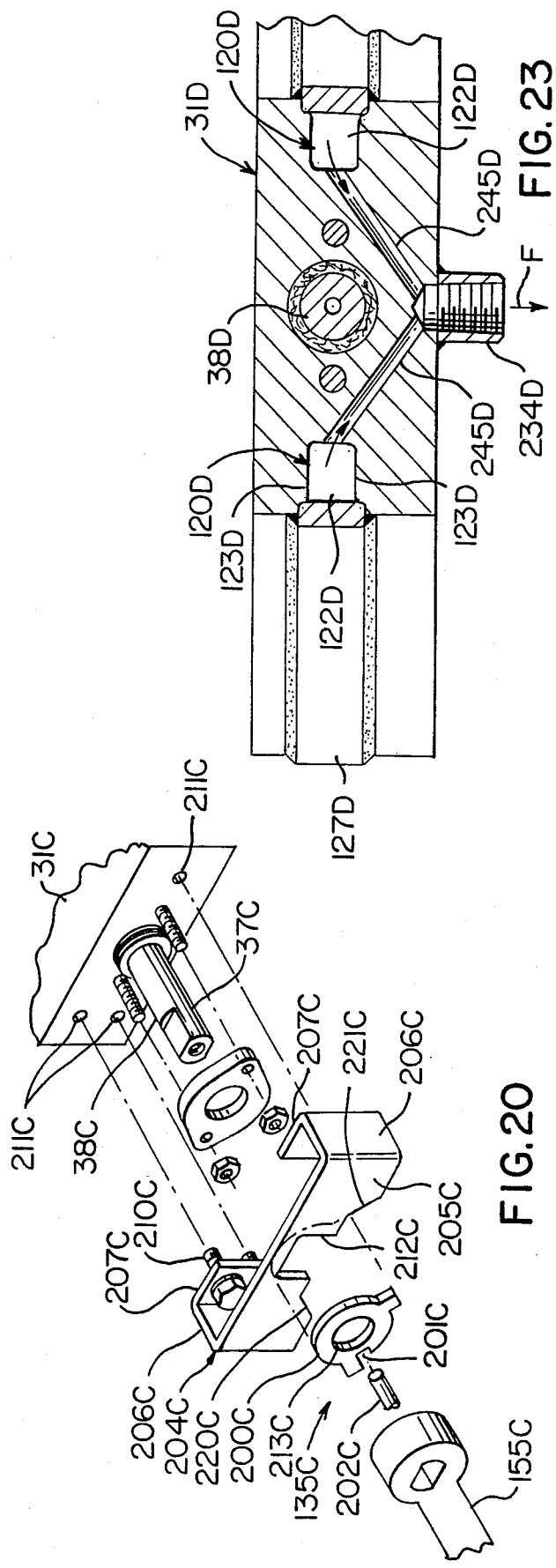
FIG. 22
FIG. 23
FIG. 20

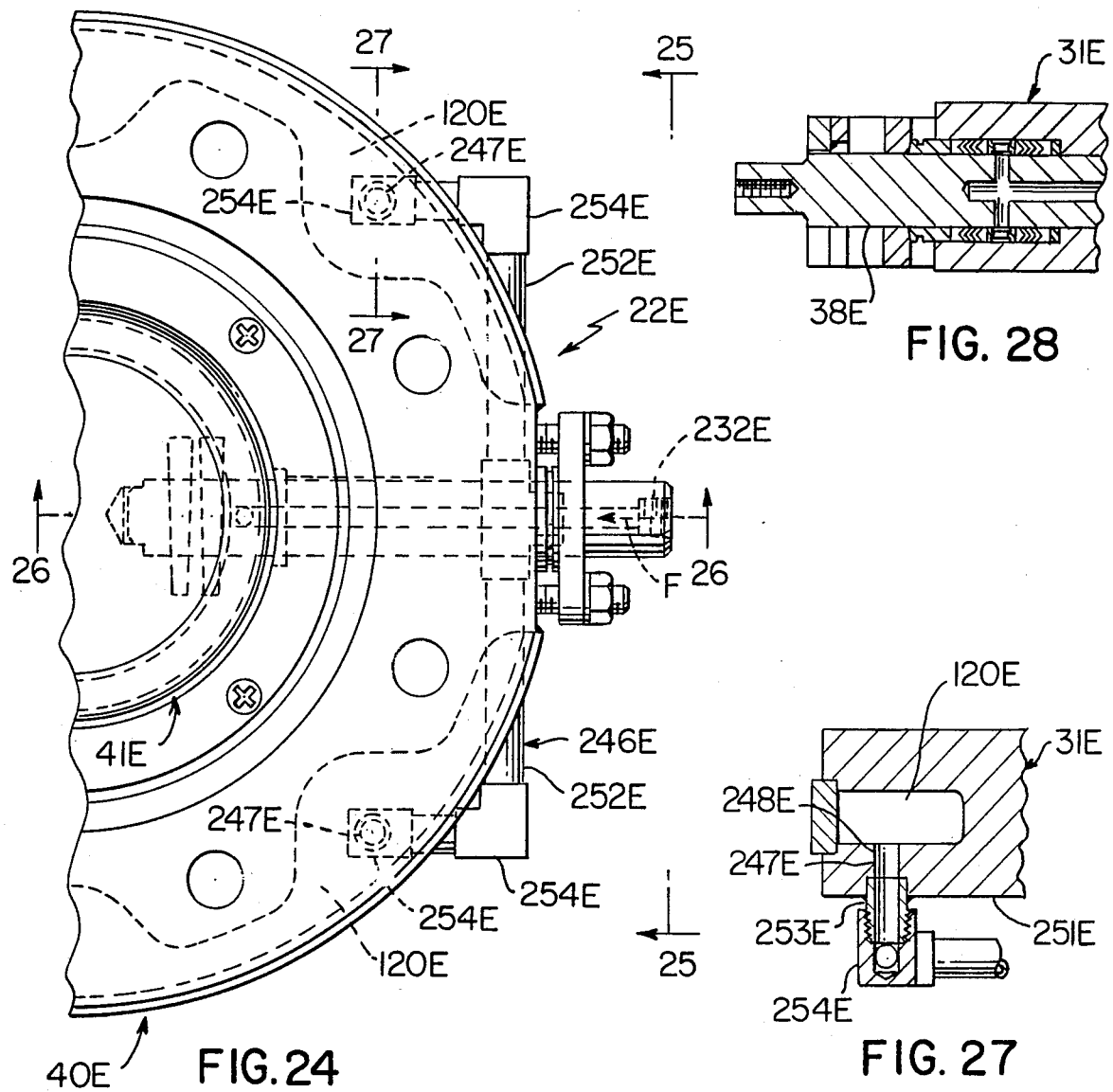

BUTTERFLY VALVE ASSEMBLY AND METHOD OF MAKING SAME

CROSS REFERENCE TO RELATED APPLICATION

This application is a continuation-in-part of applicants' copending U.S. patent application Ser. No. 549,200, filed Nov. 4, 1983 now U.S. Pat. No. 4,542,763 issued 09/24/85.

BACKGROUND OF THE INVENTION

1. Field of the Invention

This invention relates to a new butterfly valve assembly for controlling fluid flow therethrough, wherein such valve assembly is particularly adapted to be used on a railway tank car as a bottom operable lading valve.

2. Description of Prior Art

It is known in the art to provide a valve assembly for a railway tank car which is operable from the bottom of such tank car. Examples of such a valve assembly are disclosed in now U.S. Pat. No. 4,542,763 issued 09/24/85 now U.S. Pat. No. 4,518,149 issued 05/21/85. This latter application also discloses the use of a butterfly valve assembly. U.S. Pat. Nos. 4,016,907 and 4,394,002 also disclose bottom operable butterfly valves for railway tank cars.

However, the Association of American Railroads (AAR) and the Department of Transportation (DOT) have railway tank car regulations which require that projections extending in excess of 1 inch below the bottom of the tank of such a car must be protected by a skid, or if such a projection is part of a valve assembly associated with the tank car it must be capable of being sheared away without affecting the integrity of such valve assembly. In instances where a skid is provided this skid must be in the form of a ramp having a longitudinal dimension along the bottom of the tank which is three times the dimension projecting downwardly from such bottom.

It is important in providing a valve assembly for a tank car such as a railway tank car to provide a valve assembly which will not tend to open during normal usage thereof and wherein such normal usage includes continuous and substantial vibration of the valve assembly as its associated railway tank car is moved along an associated track. In an effort to prevent opening of a butterfly valve used on a railway tank car the above-mentioned U.S. Pat. No. 4,016,907 discloses a butterfly valve assembly which has a complex locking mechanism which is provided for locking the actuating stem assembly used to open and close a closure structure which comprises such valve assembly.

It will also be appreciated that in many tank cars or other applications using a butterfly valve a highly viscous fluid such as, heavy petroleum, molasses, sulphur, or the like is controlled by such valve. In these instances it is desirable and often necessary to heat various portions of the valve to promote flow of the highly viscous fluid therethrough and/or to assure satisfactory operation of the valve seals. In other applications it is desirable to cool such various portions of the valve to assure proper fluid flow therethrough and/or prevent degradation of valve components such as valve seals.

It is known in the art to provide heat exchange means for heating and/or cooling selected portions of a valve assembly or components associated therewith. For example, the above-mentioned U.S. Pat. No. 4,394,002 discloses provision of spaces in a mounting flange for a butterfly valve wherein such spaces are used to supply steam to the flange for heating purposes. Similarly, U.S. patent application Ser. No. 473,555, which issued into U.S. Pat. No. 4,559,967 on Dec. 24, 1985 discloses a butterfly valve construction which has heat exchange means in the valve body structure thereof and/or in the closure structure thereof.

The above-mentioned United States now U.S. Pat. No. 4,542,763 issued 09/24/85; also teaches a butterfly valve assembly having certain locking means for its closure structure and also teaches various embodiments of heat exchange devices for heating or cooling such valve assembly.

SUMMARY OF THE INVENTION

It is one feature of this invention to provide a new butterfly valve assembly which has a valve body structure and a closure structure and such valve assembly has a new device for locking in its closed position, a shaft assembly which is used to operate the closure structure.

For example, one embodiment of this invention provides such butterfly valve assembly which comprises a valve body structure having a fluid flow passage therethrough and first sealing surface means, a closure structure for controlling fluid flow through the passage with the closure structure having second sealing surface means adapted to engage the first sealing surface means to prevent fluid flow through the passage and define the closed position of the closure structure, shaft means fastened to the closure structure and extending through the body structure in a fluid-tight relation with the shaft means having a central longitudinal axis, actuating means for moving the shaft means and closure structure between the closed position and an open position thereof, and locking means for locking the shaft means and closure structure in its closed position. The locking means comprises a locking member supported by the body structure and has a slot therein and the actuating means comprises a pivoted lever having a locking end adapted to be pivoted into the slot once the actuating means is in the closed position to thereby provide the said locking of said actuating means and hence said shaft means in said closed position.

It is another feature of this invention to provide a new butterfly valve assembly which has new heat exchange devices for controlling the temperature thereof.

For example, another embodiment of this invention provides such butterfly valve assembly which comprises a valve body structure having a fluid flow passage therethrough and first sealing surface means, a closure structure for controlling fluid flow through the passage with the closure structure having second sealing surface means adapted to engage the first sealing surface means to prevent fluid flow through the passage and define the closed position of the closure structure, means for mounting said body structure on a supporting flange therefor, shaft means fastened to the closure structure and extending through said body structure in fluid-tight relation, actuating means for moving the shaft means and closure structure between the closed position and an open position thereof, first substantially angular heat exchange means in the body structure for controlling the temperature of the major portion thereof with the first heat exchange means comprising the outer periphery of said body structure and having practically the entire valve assembly within the confines thereof, said first heat exchange means comprising a pair of arcuate heat exchange devices each having a fluid flow channel adapted to receive a heat transfer fluid therethrough for controlling the temperature of the major portion of the body structure and also the temperature of the first sealing surface means with the first heat exchange devices having opposite ends in close proximity to said shaft means and with each of the heat exchange devices having an undulating innermost surface comprising the body structure and a substantially semicylindrical outer surface disposed concentrically therearound with the said surface defining opposed surfaces of its associated flow channel, said undulating surface being effective in providing a turbulent action and more efficient heat transfer through the modulating surface to the body structure, second substantially annular heat exchange means in the closure structure with the second heat exchange means being adapted to receive a heat transfer fluid therethrough for controlling the temperature of the outer portion of the closure structure and also the temperature of the second sealing surface means thereof, and means providing heat transfer fluid through the first and second heat exchange means. The means providing heat transfer fluid comprises a single heat transfer fluid source for both of the arcuate heat exchange devices of said first heat exchange means.

Accordingly, it is an object of this invention to provide a new butterfly valve assembly of the character mentioned.

Another object of this invention is to provide a new method of making a butterfly valve assembly of the character mentioned.

Other features, objects, uses and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which

FIG. 20 is an exploded isometric view showing the inner end portion of a handle assembly used to actuate the shaft assembly of FIG. 17 together with associated structure;

FIG. 22 is a view taken essentially on the line 22—22 of FIG. 21;

FIG. 23 is a view taken essentially on the line 23—23 of FIG. 21;

FIG. 24 is a fragmentary view of another exemplary embodiment of a valve assembly which is similar to the valve assembly of FIG. 21 and illustrating only the right end portion thereof to show a modified external fluid exit passage means;

FIG. 25 is a view taken essentially on the line 25—25 of FIG. 24;

FIG. 26 is a fragmentary view taken essentially on the line 26—26 of FIG. 24;

FIG. 27 is a fragmentary view taken essentially on the line 27—27 of FIG. 24;

FIG. 28 is a fragmentary cross-sectional view showing the opposite end portion of shaft means and associated structure comprising the valve assembly of FIG. 24;

DETAILED DESCRIPTION

Figure 10:
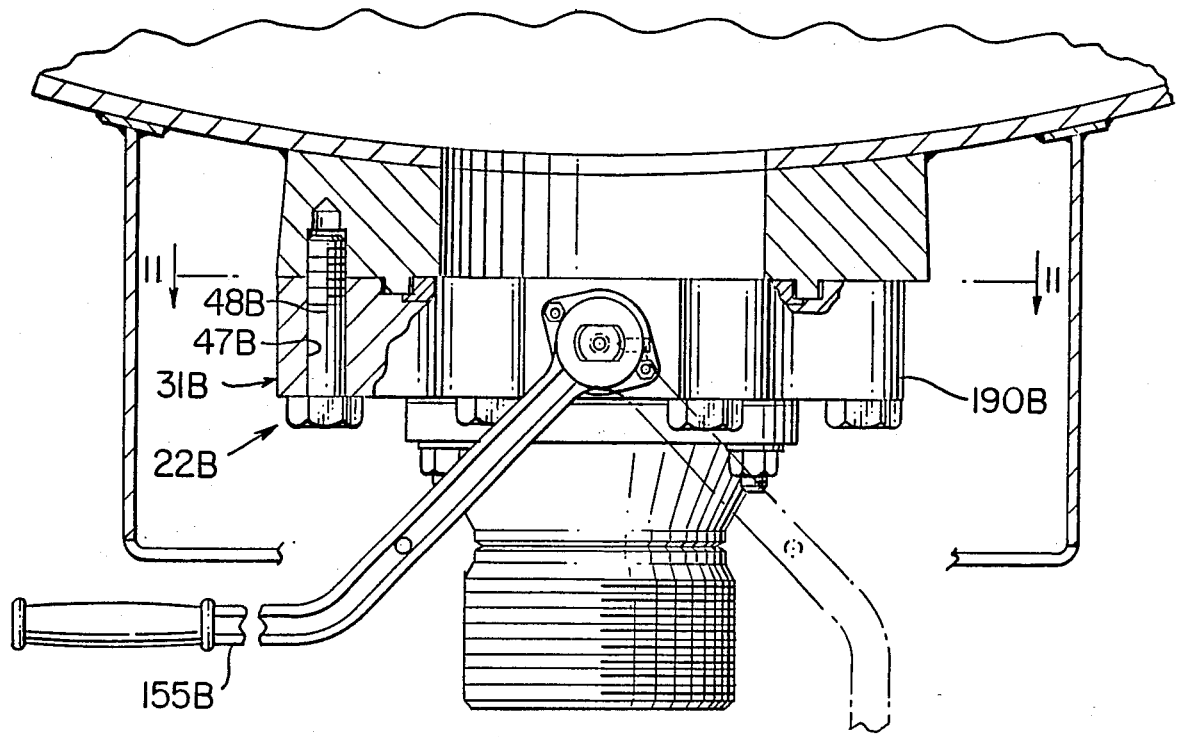
FIG. 10 is a view similar to FIG. 1 illustrating another exemplary embodiment of the invention.

The butterfly valve assembly of this invention has been illustrated and described in connection with FIGS. 1, 8 and 10 as being used as a lading valve for a tank which is shown in the form of a railway tank car. However, it is to be understood that the butterfly valve of this invention and all modifications thereof are fully usable and applicable in all other applications where butterfly valves of the types disclosed herein may be advantageously used.

Figure 1:
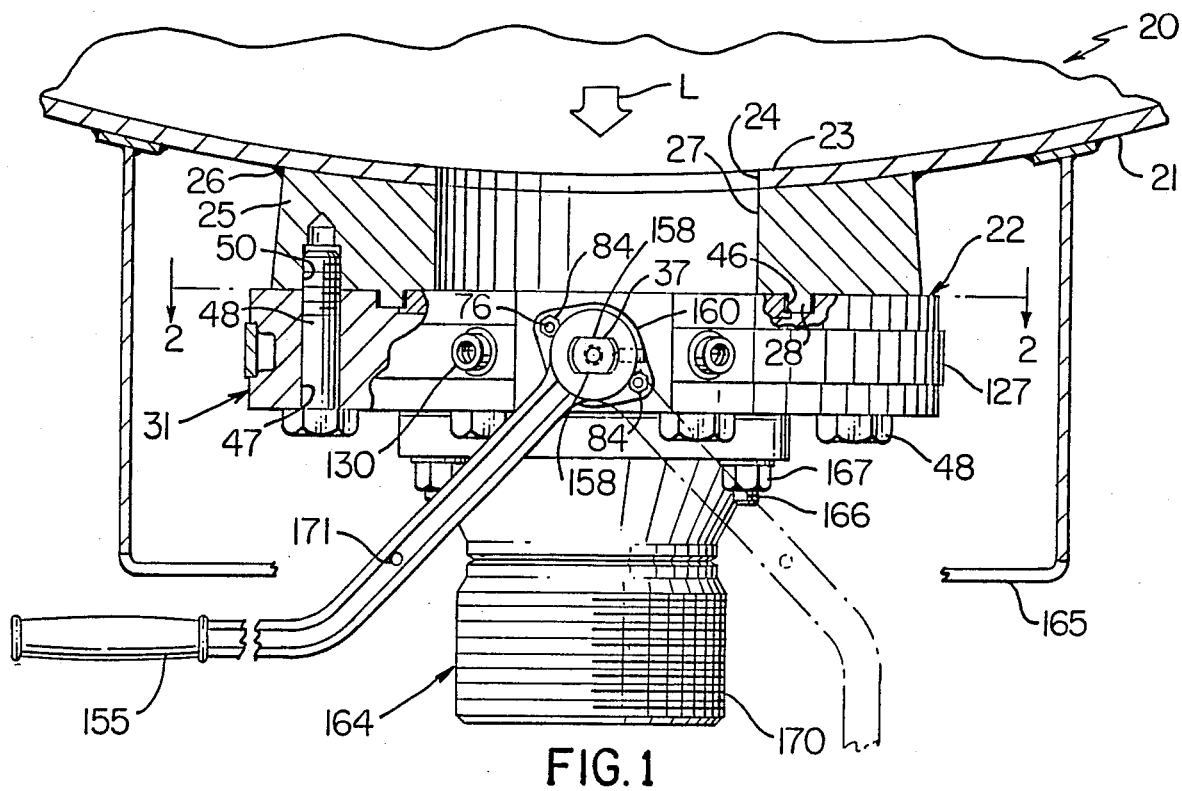
FIG. 1 is a view with parts in cross section, parts in elevation, and parts broken away illustrating one exemplary embodiment of the valve assembly of this invention mounted at the bottom of an associated tank car which is shown and described in this example as a railway tank car.

Reference is now made to FIG. 1 of the drawings which illustrates a fragmentary portion of a railway tank car which is designated generally by the reference numeral 20 and such railway tank car has a fluid-containing tank 21 which is particularly adapted to contain a fluid for transportation, usage, and/or storage. The contained fluid may be any suitable fluid and generally is in the form of a liquid, usually under positive pressure; and, such liquid is designated schematically by reference arrow L. The tank 21 utilizes one exemplary embodiment of the butterfly valve assembly of this invention and such valve assembly is designated generally by the reference numeral 22.

The valve assembly 22, being usable on fluid containing tanks of railway tank cars, is distinguishable from valves, or the like, commonly used on a so-called railway hopper car. This latter type of car is used to contain a solid material such as a particulate material, or the like, and each of such hopper cars employs a completely different type of valve gate, which is usually not fluid-tight, for emptying such hopper car.

The tank 21 has a bottom portion 23 provided with a dispensing opening 24 which is preferably of circular peripheral outline and such tank has a butterfly valve supporting flange 25 suitably fixed thereto in fluid-tight relation as by weld means in the form of a peripherral weld 26. The flange 25 has a central opening 27 therein which corresponds in size and peripheral outline to the opening 24 and is disposed in aligned relation therewith so that fluid L may be dispensed into and out of the tank 21 through the aligned openings 24 and 27 and through the valve assembly 22 once the valve assembly is in the open position. As will be apparent from the drawings the flange 25 has a thickness which is several times thicker than the thickness of the wall 21 whereby the installation of flange 25 and the valve assembly 22 at the bottom of the tank 21 does not result in a structural weakening of such tank. The flange 25 has an annular projection 28 extending from its bottom surface which is used for a purpose to be described subsequently.

The valve assembly or valve 22 is particularly adapted to be used to control the flow of the fluid or fluid media L therethrough wherein such fluid has a tendency, either due to the temperature thereof or due to such fluid itself and its constituents, to cause degradation of such valve 22 or certain of its components. It will be appreciated that degradation due to temperature of the fluid being controlled may cause structural weakness of one or more valve components. Similarly, degradation due to the fluid itself and/or its constituents may result in a buildup of undesired material on the cooperating sealing surface means or sealing surfaces of the valve 22. The buildup of undesired material may cause an abrading action during opening and closing of the valve 22 and subsequent failure of abraded components. In addition, such buildup may prevent good sealing between cooperating sealing surfaces of the valve and hence premature failure. However, regardless of the degradation action to which the improved valve 22 of this invention is subjected, such valve provides improved performance for reasons which will be apparent from the following description. Further, it should be understood that the valve 22 is very similar to the valve disclosed in the above-mentioned U.S. Pat. No. 4,559,967 and the basic disclosure of such patent is incorporated herein by reference thereto. Nevertheless, some of the description of such patent is repeated herein so that the present application will be self-contained.

Figure 3:
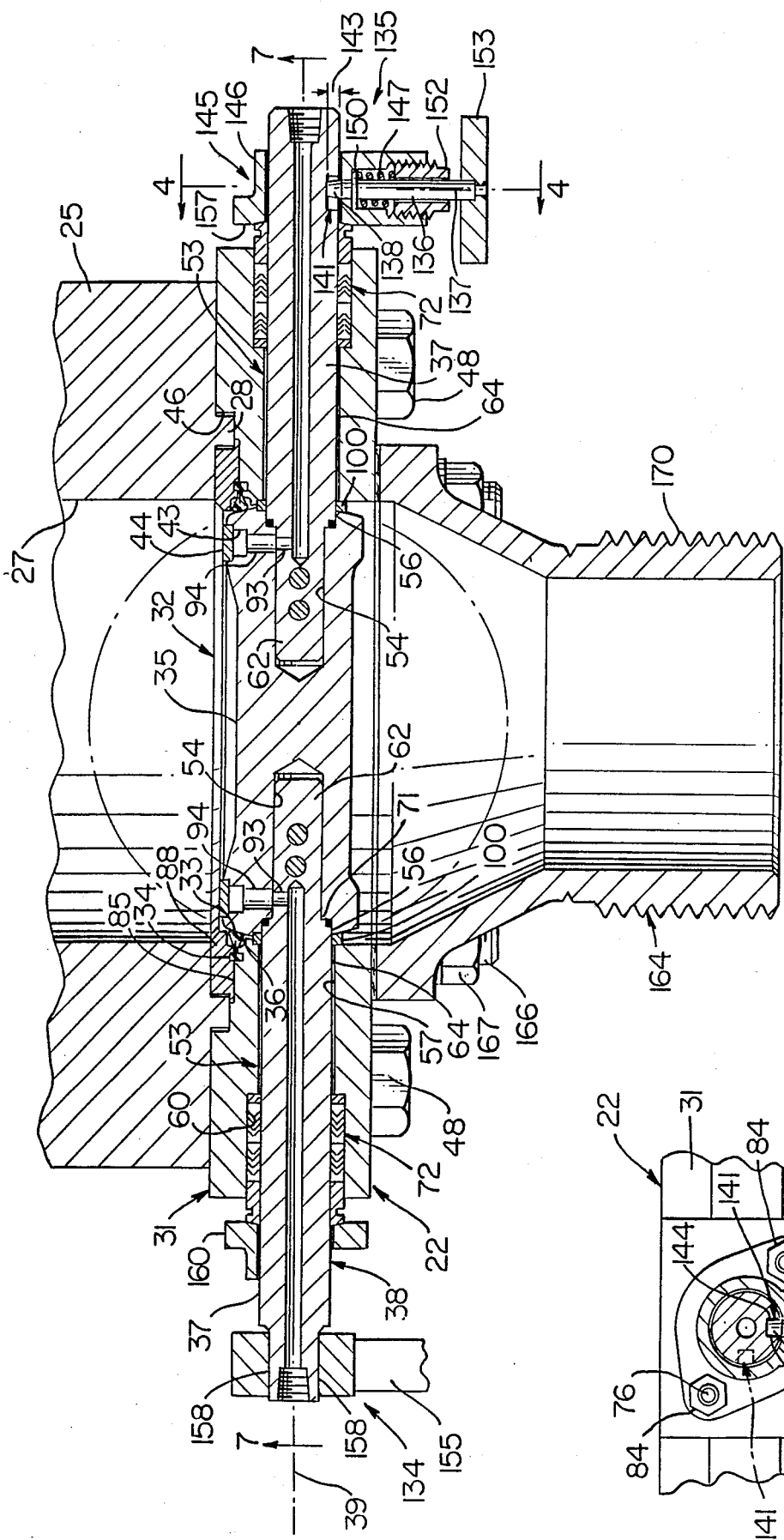
FIG. 3 is a cross-sectional view with parts broken away taken essentially on the line 3—3 of FIG. 2.
Figure 4:
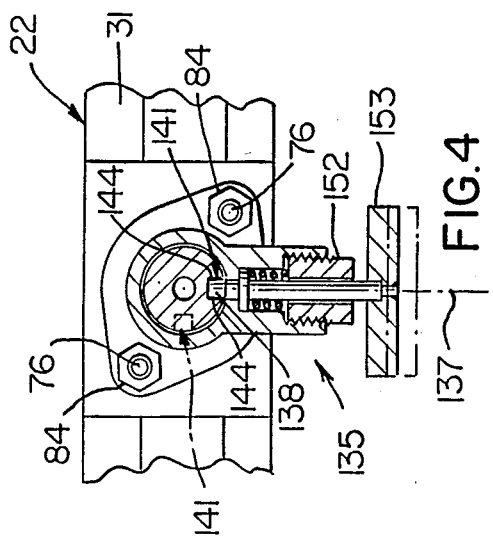
FIG. 4 is a view taken essentially on the line 4—4 of FIG. 3.

Referring now to FIG. 3 of the drawings it is seen that the valve 22 comprises a valve body structure which is designated generally by the reference numeral 31. The body structure 31 has a fluid flow passage 32 therethrough and first sealing surface means in the form of a sealing surface 33 which is provided on a sealing member 34.

The valve 22 also has a closure structure or member in the form of a closure disc 35, of circular outline, for controlling fluid flow through the flow passage 32 and the closure structure or disc 35 has second sealing surface means in the form of a sealing surface 36 which is adapted to engage the first sealing surface means or sealing surface 33 to prevent fluid flow through the passage 32 and thereby shut off fluid flow through the valve 22. The sealing surface 36 is provided in the disc 35 about the periphery thereof and such disc is mounted for partial rotation or pivotal movement within the passage 32 to open and close the valve.

The disc 35 is mounted in the body structure 31 employing a pair of shaft stems 37 which extend radially from a pair of spaced points on the disc which coincide substantially with a diametral line through the disc. The stems 37 define shaft means 38 for the valve and the shaft means has a central longitudinal axis 39. The stems 37 have their axes coinciding with axis 39 which is common thereto. The stems 37 are detachably fixed to the disc 35 in a manner to be subsequently described so that upon rotating at least one of the stems utilizing any suitable means the disc 35 is pivotally moved between open and closed positions defining corresponding open and closed positions of the valve. The shaft means 38 and in particular the stems 37 defining same extend through the body structure 31 in a fluid-tight relation and as will be described subsequently.

The disc 35 is disposed with respect to its axis and hence the common axis 39 of the stems 37 so that such disc is eccentric or offset in two mutually perpendicular directions with respect to axis 39 in a manner which is well known in the art of butterfly valves and for purposes which are also well known and thus will not be described in detail herein. The two eccentricities, in essence, provide a cam-like action to the movement of the disc 35 as it is pivoted between fully open and fully closed positions whereby the disc 35 is not subjected to a constant scrubbing of the valve sealing surfaces and thereby is free of excessive disc drag and sealing surface deformation for well known reasons.

The valve 22 comprises substantially annular heat exchange means designated generally by the reference numerals 40 and 41 (FIGS. 5–6) in the structures 31 and 35 respectively. Each heat exchange means may be disposed immediately adjacent the sealing surface means thereof for controlling the temperature of at least one of the sealing surface means. The heat exchange means 40 will be described in detail after the following description of the heat exchange means 41.

The heat exchange means 41 is provided in the closure structure or disc 35 immediately adjacent sealing surface 36 for controlling the temperature of such sealing surface and disc. Accordingly, with the closure structure or disc 35 in any position from fully open to fully closed and at all intermediate positions of the disc 35 therebetween the heat exchange means 40 and 41 are capable of providing controlled temperatures.

Each sealing surface 33 and 36 in this example of the invention is a substantially annular sealing surface and as will be readily apparent from the drawings each annular sealing surface is a substantially continuous sealing surface as well. It will also be appreciated that the substantially annular heat exchange means 41 comprises annular conduit means 42 for conveying a heat transfer fluid and such conduit means comprises a substantially annular groove 43 in the disc 35 and an annular plate 44 fixed in sealed relation over the groove 43.

Referring again to FIG. 1 of the drawings, it is seen that the valve body structure 31 has means for mounting such body structure 31 on associated supporting structures therefor. The mounting means in this example comprises an annular groove 46 which is adapted to receive the annular projection 28 of flange 25 therein and opening means in the form of openings or bores 47 through the body structure 31. The bores 47 are particularly adapted to receive threaded bolts 48 therethrough which are threadedly received in threaded openings 50 in the supporting flange 25 to thereby mount or support the body structure 31 and hence the valve 22 on such flange 25.

As previously mentioned, the closure structure or disc 35 is suitably pivotally fastened in the body structure 31 utilizing the shaft means 38 or stems 37. Further, except for a longitudinal slot (to be described later) in one of the stems 37 and actuating means comprising the other stem 37 such stems are substantially identical and thus each will be given the same reference numeral 37. In view of this the detailed description will now proceed with the description of the left stem and its components, as shown in FIG. 3, with it being understood that such description of the left stem 37 and its components is fully applicable to the right stem 37 of FIG. 3 and its components.

Each stem 37 is disposed in an associated bore means 53 which extends through an associated portion of the body structure 31 and an associated bore means or bore 54 in an associated portion of the disc 35. In particular, it will be seen that each bore 54 is provided in a peripheral part of the disc 35 and such bore and a counterbore 56. The bore 54 and counterbore 56 are disposed on a common axis coinciding with the axis 39.

Each bore means 53 in the body structure 31 comprises a bore 57 in an associated part of the body structure 31 and has a counterbore 60. The bore 54, counterbore 56, bore 57, and counterbore 60 associated with each stem 37 have axis which are common with and coincide with the axis 39.

Figure 7:
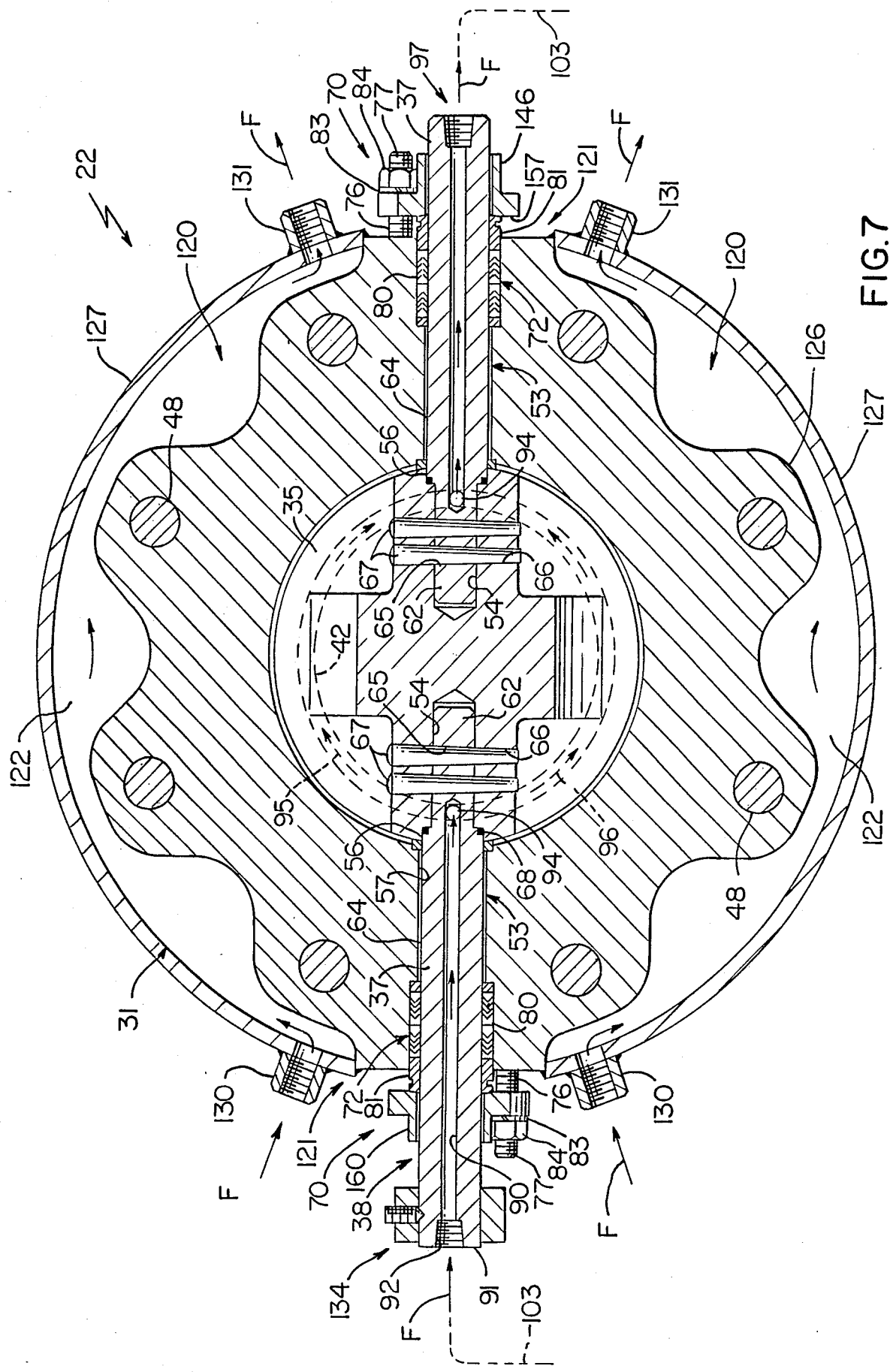
FIG. 7 is a cross-sectional view taken essentially on the line 7—7 of FIG. 3.

Each stem 37 has an inner part 62 which is adapted to be received within its bore 54 in non-interfering relation with the surface defining such bore. In addition, each stem 37 has a larger diameter cylindrical outer portion 64 provided with an annular shoulder 71 between its inner part 62 and outer portion 64. Each stem 37 also has a pair of bores 65 which are aligned with a corresponding pair of bores 66 in the disc 35 (FIG. 7). The associated bores 65 and 65 receive associated pins 67 therethrough and the pins 67, in essence, lock an associated stem 37 to the disc 35 and thereby prevent rotational movements of the stem as well as axial movements of such stem relative to the disc 35. The pins 67 may be sealed at their ends by any suitable means, for example, welding.

To provide a fluid-tight seal between the inner part of each stem 37 and the disc 35 an annular polymeric sealing ring 68 is disposed in the counterbore 56 and between the shoulder 71 and disc 35.

As seen in FIG. 7, the valve 22 also has means 70 including packing means 72 for providing a fluid-tight seal between each stem 37 and the valve body structure 31. Each means 70 comprises a plurality of two studs 76 having inner end portions threaded within the body structure 31 and having threaded outer ends 77. Each packing means 72 comprises a plurality of axially stacked so-called chevron packing rings 80 which are disposed within the counterbore 60, and a follower ring or follower 81.

Each follower 81 has an inner end which engages the outermost one of the chevron rings 80 and an outer end which is adapted to be engaged by what will be referred to at this point as stop followers 146 and 160 at opposite ends of the shaft means 38. Each stop follower 146 and 160 has a pair of openings which receive the threaded outer ends 77 of its associated studs 76 therethrough and washers 83 are disposed around the threaded outer portions 77. A pair of threaded nuts 84 are provided and threaded over the threaded outer portions 77 of the studs 76.

With the above-described components of each means 70 it is a simple matter to prevent any possible leakage of fluid from within the valve 22 and axially along an associated stem 37 and hence the shaft means 38. This is achieved by threading associated nuts 84 along the threaded portions 77 of associated studs 76 urging the associated washers 83, stop follower 146 or 160, and follower 81 against associated chevron packing rings 80. This urging controls the physical deformation of such rings 80 and thereby the engagement of such rings 80 with their stems 37 and adjoining part of the body structure 31, as is known in the art, to thereby prevent any possible leakage from around the outside surface of such stem 37.

In this disclosure of the invention, a sealing member 34 has been illustrated and described as being carried by the valve body structure 31; and, such sealing member 34 is illustrated as being of a particular configuration. However, it is to be understood that such sealing member may be of any suitable configuration which is known in the art and typical configurations are illustrated in U.S. Pat. No. 4,289,296 the disclosure of which is incorporated herein by reference thereto. Likewise, the sealing member 34, regardless of its configuration, may be made of suitable material or materials as known in the art including metallic and/or nonmetallic materials.

Figure 2:
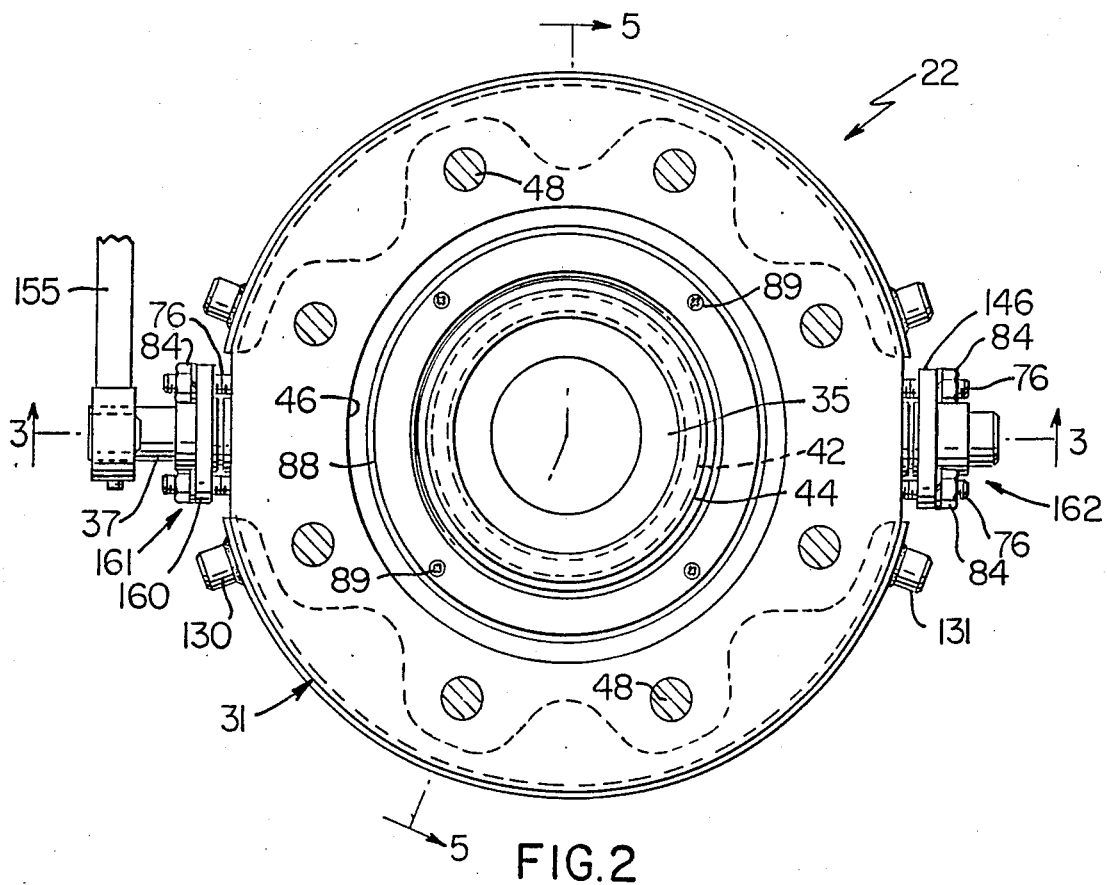
FIG. 2 is a view taken essentially on the line 2—2 of FIG. 1.

The member 34 is preferably detachably fixed in position using any suitable means; and as seen in FIG. 3 of this example a retainer ring 88 is used for this purpose. The ring 88 is disposed within a cooperating substantially annular cutout 85 in the body structure 31; and, such ring 88 is suitably fixed in position by a plurality of threaded fasteneing screws 89—FIG. 2.

Having described certain main structural components of the valve 22, the detailed description will now proceed with a detailed description of the substantially annular heat exchange means 41 and for this description reference is again made to FIG. 3 of the drawings. As previously mentioned, the substantially annular heat exchange means 41 comprises conduit means 42 in the disc 35 in the form of substantially annular groove means or a groove 43 and an annular plate 44 which is suitably fixed in sealed relation over the groove 43 by suitable welds.

The substantially annular heat exchange means 41 in this exemplary embodiment is provided in the form of annular heat exchange means for circulating a heat transfer fluid F. Accordingly, means is provided for providing such heat transfer fluid F to the annular heat exchange means 41 and removing same therefrom, as illustrated in FIG. 7. The actual structural components and means associated with each stem 37 for providing fluid F to the heat exchange means 41 and removing such fluid F from the heat exchange means are substantially identical. Therefore, the detailed description will proceed with only a description of the components and means for supplying fluid F to the left stem 37 with it being understood that the fluid F exits the right stem 37 through substantially identical components and means also communicating with the heat exchange means 41. Actually the flow of heat transfer fluid F may be reversed, if desired, by providing such fluid into and through the right stem 37, through the substantially annular heat exchange means 41, and out of the left stem 37.

Each stem 37 has an axial bore 90 which extends the major part of the axial length thereof from an outer surface 91 thereof inwardly and axially therealong to a location just short of the first bore 65 in the inner portion of such stem 37. A threaded inlet 92 is provided to the axial bore 90 in each stem 37 for the purpose of threading a connector of a fluid conduit which is to be placed in fluid communication with the bore 90.

Each stem 37 also has a cross bore 93 (FIG. 3) disposed substantially perpendicular to the axis 39 and communicating with the terminal inner end portion of the bore 90; and such cross bore 93 is disposed so that with the stem 37 installed in its desired position the cross bore 93 is located inwardly of the annular seal 68. The cross bore 93 of each stem 37 is constructed, arranged, and dimensionally disposed such that it communicates with a cooperating cross bore 94 in the closure structure or disc 35. Each cross bore 94 communicates with the inner portion of the groove 43.

Thus, heat transfer fluid, such as a suitable heat transfer liquid F, is introduced under positive pressure into the bore 90 of the left stem and such fluid flows through the aligned cross bores 93 and 94 into the groove 43 defining the substantially annular conduit means 42 of the substantially annular heat exchange means 41. Once the heat transfer fluid F enters the conduit means 42 it flows in opposed directions as illustrated by arrows 95 and 96 in FIG. 7 whereby such flow is about the entire periphery of the disc 35. The fluid F then flows out of the conduit means 42 and flows through cross bore 94 in the right portion of the disc 35, associated aligned cross bore 93 in the right stem 37, and associated axial bore 90 in such right stem 37. The fluid F then exits the right valve stem 37 as illustrated at 97.

The substantially annular heat exchange means 41 is provided with precise dimensional placement in the outer peripheral portion of the disc 35 such that heat transfer fluid F is in very close proximity to the second sealing surface means or the sealing surface 36 of such disc 35. This placement of the annular heat exchange means 41 assures precise control of the temperature of the sealing surface means or surface 36 as well as the temperature of the entire disc 35, stems 37 and components contacting the stems 37. Obviously, this is possible because the temperature, flow rate, and heat transfer characteristics of the fluid F can be controlled with great precision and as is known in the art.

With the structure described above, it is possible to control the temperature of the sealing surface means or sealing surface 36 in instances where it is desired to cool or heat the sealing surface 36. Accordingly, in those instances where the temperature of the fluid or fluid media L flowing through the valve 22 is such that particles in or of such media tend to accumulate on the sealing surface 36, the temperature of fluid F is controlled to a higher level causing a controlled heating of the sealing surface 36. This heating assures that particles or portions of the media L will not accumulate on the outer sealing surface 36 by, in essence, being heated so as to flow away therefrom. In this manner, a smooth fluid-tight sealing action is provided once the surface 36 engages the sealing surface 33. This sealing action is also achieved in a non-sticking and non-abrading manner. For example, in an application where the fluid media L being controlled by the valve 22 contains sulphur there is minimum tendency for any of such sulphur to condense or accumulate on the sealing surface 36 and cause poor sealing and/or an abrading action.

It will also be appreciated that in many applications the temperature of the fluid media L being controlled by the valve 22 is such that it may be desirable to circulate a substantially cooler fluid F through the annular heat exchange means to cool the sealing surface and valve components to protect the structuraly integrity thereof and/or prevent accumulation of particles from the fluid media thereon.

The above presents a description of the structure defining the heat exchange means 41, the disc 35, stems 37, and associated component portions. The manner in which these items are made and assembled is well known and is basically similar to the description of similar components presented in the above-mentioned U.S. patent application Ser. No. 473,555.

It will also be appreciated that the installation and placement of the disc 35 within the body structure are aided by annular disc spacers 100, as shown in FIG. 3. The disc spacers 100 serve to locate the disc 35 along the axis 39 yet within the body structure 31 and also serve as thrust bearings for such disc.

To assure that the valve 22 may be operated by rotating either one or both actuating stems 37 thereof without interfering with the provision of heat transfer fluid F to and through such valve 22, suitable flexible conduits, such as braided metal conduits lined with a suitable polymeric material, for example, may be connected by suitable connectors (not shown) to the threaded outer portions or ends 92 of the bores 90. These flexible conduits are shown schematically by dot-dash lines in FIG. 7 and are each designated by the same reference numeral 103.

Figure 5:
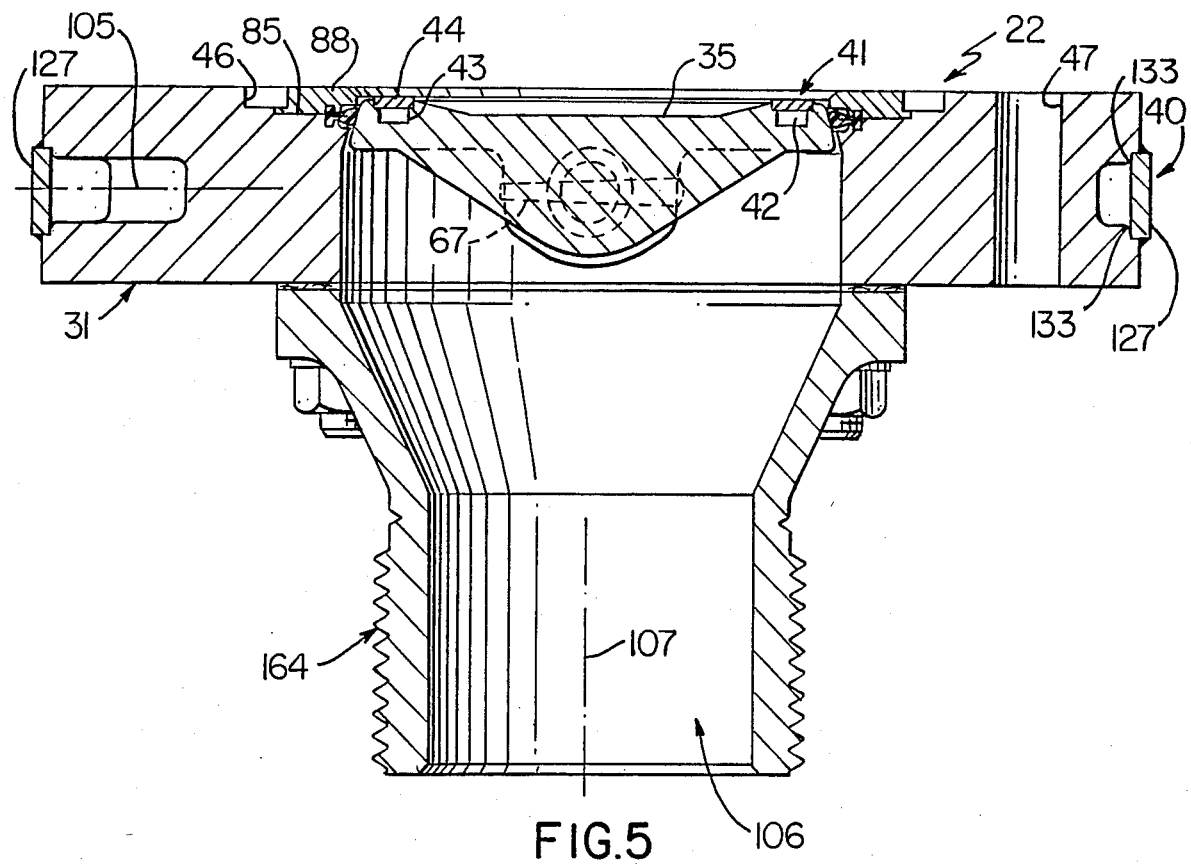
FIG. 5 is a cross-sectional view taken essentially on the line 5—5 of FIG. 2 and showing the closure structure for the valve assembly in its closed position.
Figure 6:
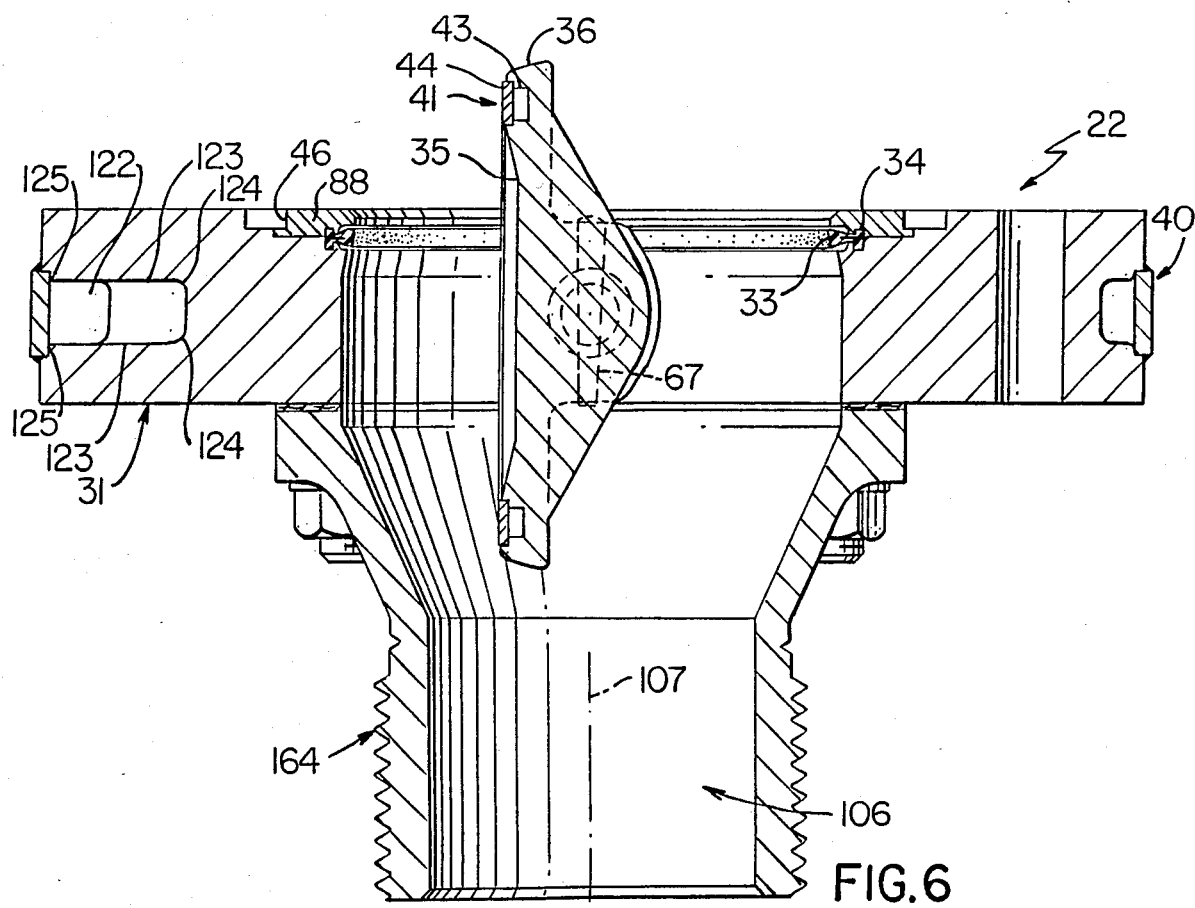
FIG. 6 is a view similar to FIG. 5 and showing the closure structure in its open position.

Having described heat exchange means 41 in the disc 35, and parts associated therewith, reference is now made to FIGS. 5 through 7 of the drawings from a detailed description of the heat exchange means 40 in the body structure 31. As will be readily apparent from the drawings, the heat exchange means 40 comprises the outer periphery of the body structure 31 and has practically the entire valve assembly 22 disposed within the confines thereof. In particular, it will be seen that the heat exchange means 40 is disposed symmetrically with respect to a plane indicated by dot-dash lines in FIG. 5 and designated by the reference numeral 105; and such plane substantially bisects the body structure 31. The plane 105 is also disposed perpendicular to the longitudinal fluid flow passage 106 through the valve assembly 22 and such passage has a central longitudinal axis 107. This disposal of the heat exchange means 40 assures that the temperature of the body structure 31 and of the first sealing surface means or sealing surface 33 are controlled in an efficient manner.

Referring again to FIG. 7 of the drawings it is seen that the heat exchange means comprises what will be referred to as a pair of arcuate heat exchange devices, each designated by the same reference numeral 120 and such devices 120 are disposed on opposite sides of the shaft means 38. Each of the arcuate heat exchange devices 120 has its opposite ends in close proximity to the shaft means and as shown at typical locations 121, for example. Further, although each heat exchange device 120 may have any suitable form it will be seen that in this example each heat exchange device is defined in the form approximating a crescent.

The mounting means for the valve assembly 22 comprises a plurality of bores 47 in the body structure 31 and such bores are adapted to receive fasteners therethrough. The bores are disposed symmetrically about the central longitudinal axis 107 of the flow passage on a common fastener circle and it will be seen that the arcuate heat exchange devices 120 are disposed concentrically with and outwardly of the bores 47.

Each of the arcuate heat exchange devices 120 comprises a fluid flow channel 122 in the body structure 31 for receiving a heat transfer or heat exchange fluid therethrough; and, such fluid is also designated by the reference letter F.

Referring now to FIGS. 5 and 6 it is seen that each of the channels 122 is defined by a pair of parallel spaced apart planar side surfaces each designated by the same reference numeral 123. The planar side surfaces 123 have undulating inner edges 124 and substantially semicircular outer edges 125. Each device 120 also has an undulating innermost surface 126 (FIG. 7) which adjoins the undulating inner edges 124 of the side surfaces and a substantially semicylindrical band 127 is fixed to the body structure and adjoins the semicircular outer edges 125 of the planar side surfaces 123.

Each device 120 also has means providing a fluid inlet for its flow channel 122; and, in this example such means is in the form of an inlet fitting 130 which is suitably welded in position at one end portion of the band 127 and such fitting has internal threads for receiving an associated threaded fitting therein. Each device 120 has means providing a fluid outlet for its fluid flow channel 122 and such means is in the form of a fitting 131 which is also suitably welded in position at the opposite end portion of the band 127. The outlet fitting 131 has internal threads therein for receiving an associated threaded fitting therein. The fittings 130 and 131 enable suitable supply and discharge conduits to be connected to an associated heat exchange device 120 and in particular to the fluid flow channel 122 of such device 120 for passage of heat transfer fluid F therethrough. The fittings 130 and 131 are welded in position over associated openings or bores in their associated band 127 to provide access to and from an associated flow channel 122.

The valve body structure 31 has the major portion of each channel 122 defined therein as an integral part thereof by any suitable means, such as, by casting or molding techniques. Having thus defined each channel 122, it is only necessary to weld a substantially semicircular band in position thereover in a fluid-tight manner whereby the construction of the fluid flow channels 122 is achieved with optimum simplicity.

It will also be appreciated that the scalloped or undulating configuration of the surface 126 enables the provision of valve assembly 22 having a substantially light weight. Further the undulating innermost surface provides a turbulent action to heat transfer fluid flowing through the channel 122 thereby providing a scrubbing action and more efficient heating of the body structure 31 by fluid flowing therethrough.

Referring again to FIGS. 5 and 6, it is seen that each band 127 is easily installed in position on the outer portion of the body structure 31 due to a pair of cutout ledges 133 which are provided in the body structure in a symmetrical manner on the outer portion of the fluid flow channel 122. Each roughly semicircular band 127 is then installed with its opposite sides nested within cutout ledges 133 and welded in position in a fluid-tight manner.

As previously described the shaft means 38 has a central longitudinal axis 39 and actuating means designated generally by the reference numeral 134 is provided for moving the shaft means 38 and hence the closure structure or closure disc 35 between the closed position thereof which is illustrated in FIG. 5 and an open position thereof which is illustrated in FIG. 6. In accordance with the teachings of this invention the valve assembly 22 has improved locking means which is designated generally by the reference numeral 135 for locking the shaft means 38 and the closure structure or disc 35 in its closed position.

The improved locking means 135 comprises a latch pin 136 which has a central longitudinal axis 137 and a locking end portion 138 at the terminal end thereof which is adapted to engage the shaft means 38, and in particular a selected stem 37 of such shaft means 38. The locking means 135 and in particular the latch pin 136 thereof provides a positive locking action under all operating conditions including under conditions of severe vibration normally encountered during usage of the valve assembly 22 in a typical railway application.

Figure 15:
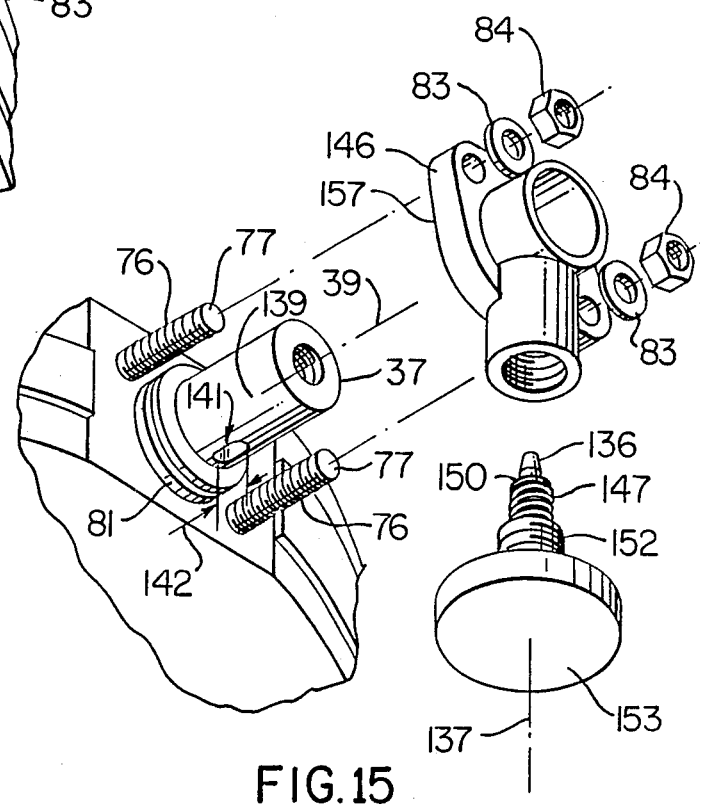
FIG. 15 is an exploded isometric view of the locking means of FIG. 14.

As will be readily apparent from FIGS. 3 and 15 of the drawings the latch pin 136 is disposed with its longitudinal axis 137 coplanar with and transverse to the longitudinal axis 39 of the shaft means 38. This arrangement of pin 136 with its locking end portion 138 provides a positive locking action without substantially diminishing the structural strength of the shaft means 38 and as will now be explained.

As will be readily apparent from FIG. 3 of the drawing the shaft means 38 has a longitudinal slot 141 therein which extends radially inwardly from a cylindrical outside surface thereof and in particular from a cylindrical outside surface 139 of its associated stem 37. As shown in FIG. 15 the slot has a controlled axial length 142, a limited depth 143 (FIG. 3A) and opposed side surfaces each designated by the same reference numeral 144, which define its width. The slot 141 is particularly adapted to receive the locking end portion 138 therewithin to provide the positive locking action without the likelihood of disengagement even with severe vibration during normal use. The locking end portion 138 is held in position in a manner now to be described.

The valve assembly 22 also comprises multiple purpose means, designated generally by the reference numeral 145, supporting the pin 136 with its longitudinal axis 137 coplanar with and perpendicular to the axis 39. The multiple purpose means 145 comprises means in the form of a housing structure 146 which supports the pin 136 with its longitudinal axis 137 coplanar with and perpendicular to the longitudinal axis 39.

Urging means in the form of spring means, shown as a mechanical compression spring 147, is provided and carried by the supporting housing 146; and, the spring 147 normally yieldingly urges the pin 136 toward the shaft means 38 and the axis 39 thereof such that in its locked position the pin 136 has the locking end portion 138 thereof disposed in the slot 141 for engagement by one of the side surfaces 144. The spring 147 engages both the supporting housing 146 and the pin 136, by engaging a collar 150 fixed to the pin 136 adjacent the locking end portion 138. The collar is adapted to engage an inside bottom surface in a bore provided in the supporting housing 146 to limit the extent of movement of the pin toward the axis 39.

The locking means 135 also comprises an externally threaded plug-like member 152 which is threaded within internal threads provided in the supporting housing 146. The member 152 has an inside bottom surface which is engaged by the compression spring 147 whereby the spring acts between the supporting means or housing 146 and the pin 136, i.e., collar 150 thereof, to urge the locking end portion 138 into its locked position.

Figure 14:
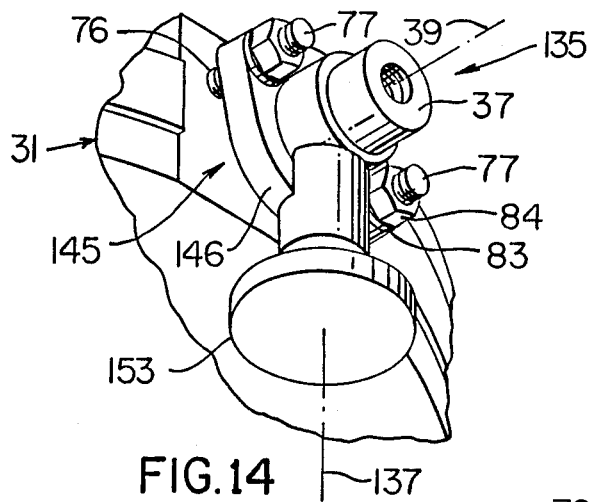
FIG. 14 is a fragmentary isometric view particularly illustrating the locking means at one end of shaft means associated with the butterfly valve closure structure and such locking means is fully applicable to each and every embodiment of the valve assembly of this invention.

The threaded member 152 has a central opening or bore therethrough which is provided with sufficient clearance to allow unobstructed sliding movement of the outer end portion of the pin 136 such that the pin is constantly urged and moved axially along its axis 136 by the spring 147 in one direction toward axis 39 to provide a locking action. The pin 136 has a grasping member or knob 153 (FIGS. 3, 14, and 15) fixed to its outer end which enables the pin 136 to be moved in an opposite direction, away from axis 39, to thereby unlock the shaft means 38 and hence the disc 35 and allow opening thereof. The grasping handle or knob 153 is adapted to be grasped manually to override the compression spring 147 and remove the locking end portion 138 from within the slot 141. The bore in the member 152 allows unobstructed movement of the pin in either direction, as previously mentioned, and the cylindrical surface defining such bore serves as a sleeve bearing for the pin 136.

As readily apparent from FIG. 3 the actuating means 134 for the shaft means 38 is adapted to the actuated independently of and at a location disposed in spaced relation from the location of the grasping member 153. The spaced relation referred to is a distance greater than the maximum dimension of the body structure 31. This arrangement provides a safety feature which prevents inadvertent movement of the closure structure or disc 35 from its closed position except by a positive action to unlock the locking pin 136 and then manually actuate the actuating means 134 and in particular an actuating handle 155 of such actuating means 134.

As previously explained the closure structure or disc 35 is a substantially circular closure disc and the shaft means 38 comprises a pair of shaft stems 37 which extend radially from a pair of spaced points on the disc 35 and such points coincide with a diametral line through the disc. It will be seen that one of the stems 37 is adapted to be engaged by the actuating handle 155 and the other of the stems 37 has the slot 141 therein.

The valve assembly 22 comprises packing means between the shaft means 38 and the body structure 31 to thereby provide a fluid-tight relation therebetween. The packing means in this example of the invention comprises a pair of substantially identical packing assemblies associated with the stems 37 whereby each packing assembly will be designated generally by the reference numeral 72. It was also previously mentioned that the valve assembly 22 has multiple purpose means 145 comprising housing structure 146 as shown in FIG. 3. The multiple purpose means 145 and in particular housing 146 thereof has means in the form of a surface portion 157 which engages an associated packing means 72 to thereby enable sufficient compression thereof and assure the provision of the fluid-tight relation. It will also be appreciated that the controlled axial length 142 of the slot 141 is sufficiently long that with the locking end portion 138 of the pin 136 in the slot 141 the sufficient compression of the packing assembly 72 and unobstructed operation of the pin 136 are assured.

As previously mentioned, means is provided in the shaft means 38 and in particular in one stem 37 thereof which is adapted to be engaged by the actuating means or actuating handle 155. Although any suitable means may be provided in stem 37, in this example of the invention such means comprises at least one pair of opposed flat surfaces each designated by the same reference numeral 158 (FIG. 3). The surfaces 158 are adapted to be engaged by cooperating flat surfaces comprising walls of an opening in the actuating handle 155.

The valve assembly 22 also has means in the form of a member 160 which is associated with that stem 37 which has the handle 155 thereon. The member 160 engages its associated packing means 72 to enable compression thereof and assure provision of the fluid-tight relation between its associated stem 37 and the valve body structure 31. The member 160 is suitably held to the body structure by a pair of threaded studs which are threaded into the body structure 31 and extend through associated opening in the member 160. Threaded nuts are threaded on the outer ends of the studs and hold the member 160 in position while compressing the associated packing means 72. This structure is shown at 161 in FIG. 2. It will also be seen that similar threaded studs and threaded nuts are provided at the opposite end of the shaft means 38 to hold supporting housing 146 in position, as shown at 162, and while holding its associated packing means 72 compressed.

As seen in FIG. 1 the valve assembly 22 has an adapter 164 which extends beneath a ramp-like assembly 165 which is fixed to the tank 21 in accordance with the AAR specifications previously mentioned. The adapter 164 is held in position by threaded studs 166, which extend into the valve body structure 31, and associated threaded nuts 167. The adapter 164 has an externally threaded end portion 170 for connecting an associated conduit or pipe thereto.

As is known in the art, the studs 166 are designed such that adapter 164 may be readily sheared away from the remainder of the valve body structure 31 without damage thereto. It will also be appreciated that the actuating handle 155 is also constructed so that it too may be readily sheared away and as is known in the art. The handle 155 is similar to the actuating handle described for the railway tank car valve disclosed in the above-mentioned U.S. patent application Ser. No. 459,462. As described in the application mentioned in this paragraph the handle 155 has an opening 171 therein as described in such application to facilitate shearing thereof. The details of the handle and associated structure provided to assure shearing presented in application Ser. No. 459,462 are fully applicable to the valve of this invention and the disclosure of such application is incorporated herein by reference thereto.

Other exemplary embodiments of the valve assembly of this invention are illustrated in FIGS. 8–9 and 10–13. The valve assemblies illustrated in FIGS. 8–9 and 10–13 are similar to the valve assembly 22; therefore, such valve assemblies will be designated generally by the reference numerals 22A and 22B respectively and certain representative parts of each valve assembly which are similar to corresponding parts of the valve assembly 22 will be designated in the drawings by the same reference numerals as in the valve assembly 22 (whether or not such representative parts are mentioned in the specification) followed by the associated letter designation, either A or B, and not described again in detail. Only those component parts of each valve assembly 22A or 22B which are substantially different from corresponding parts of the valve assembly 22 will be designated by a new reference numeral also followed by the associated letter designation and described in detail.

Figure 8:
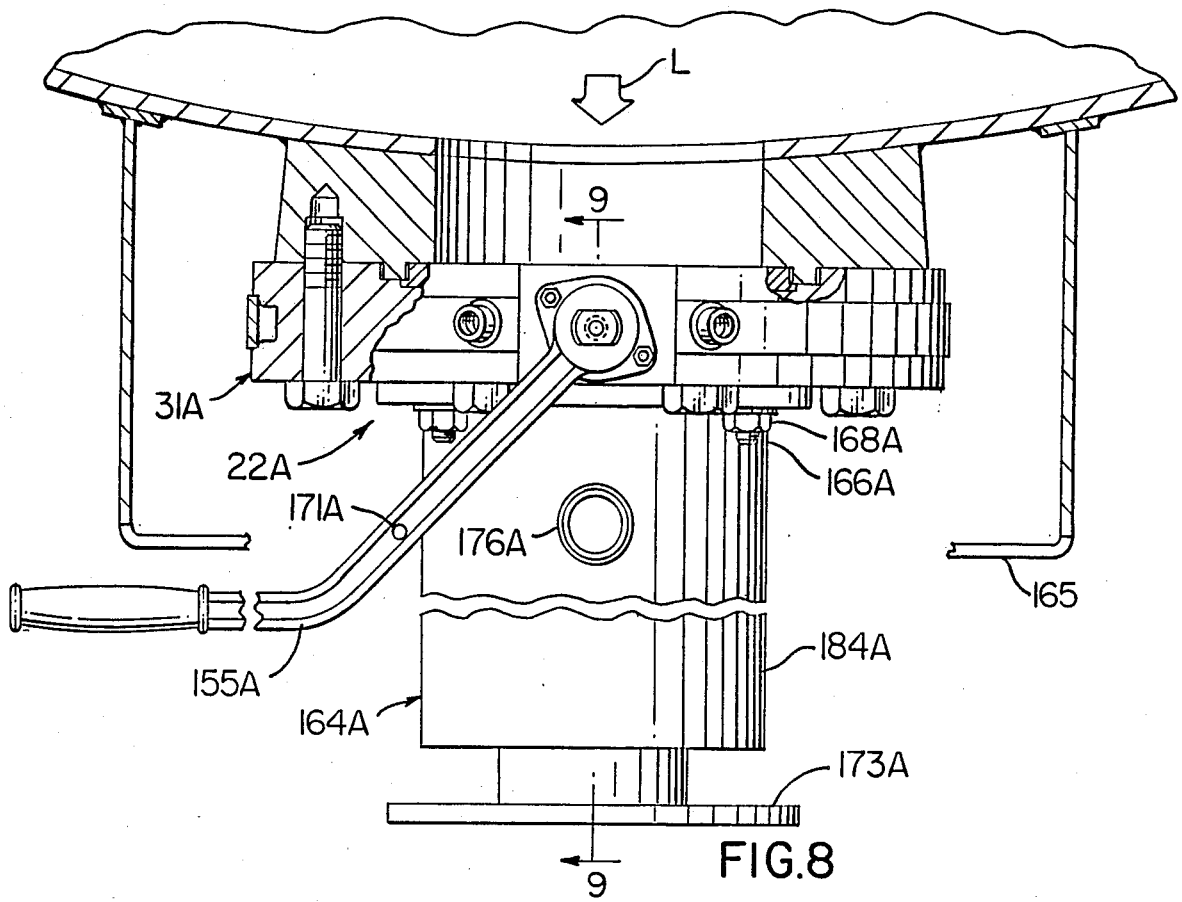
FIG. 8 is a view similar to FIG. 1 illustrating another exemplary embodiment of the invention.
Figure 9:
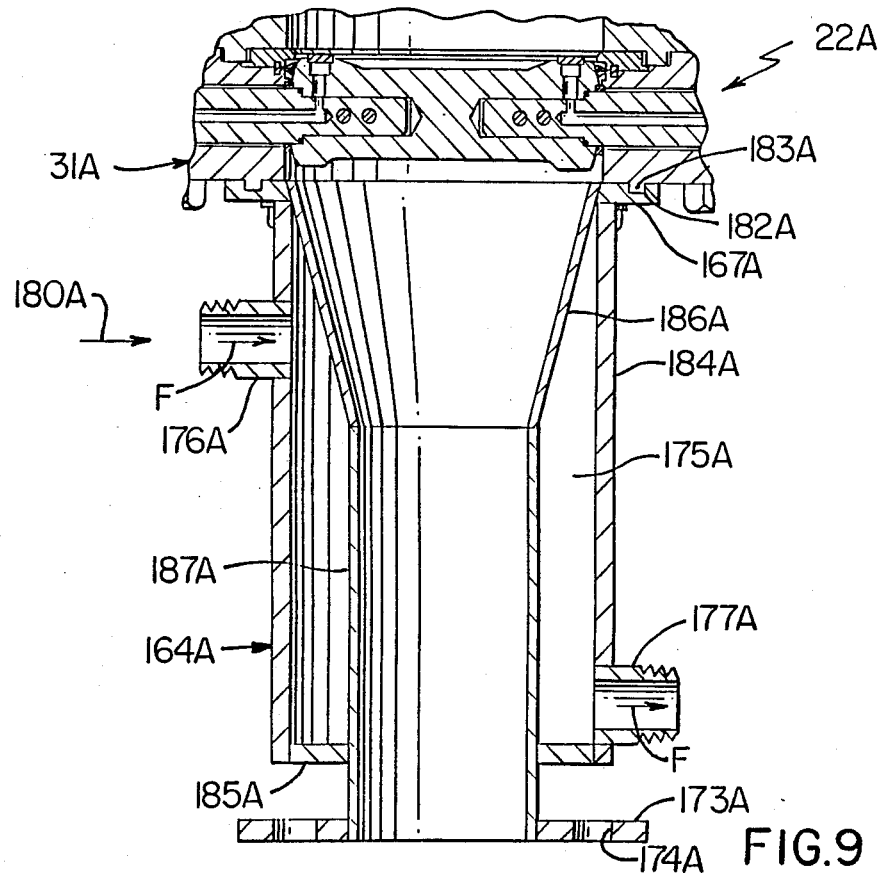
FIG. 9 is a fragmentary cross-sectional view similar to the central and lower portions of FIG. 3 particularly illustrating parts of the valve assembly of FIG. 8.

The valve assembly 22A of FIGS. 8–9 is substantially identical to the valve assembly 22 with the exception that the valve assembly 22A has a unique adapter 164A which extends beneath its associated ramp-like assembly 165 which, as previously described, is provided in accordance with AAR specifications. The adapter 164A is held in position by threaded studs 166A which have threaded inner ends which are threaded into the valve body structure 31A and have threaded outer ends which extend through openings in a mounting flange portion 167A of the adapter. Threaded nuts 168A hold the flange 167A and adapter 164A in position. The adapter has an integral outlet flange 173A which is provided with spaced openings 174A on a common circumference and the integral flange 173A and openings 174A are used for connecting an associated conduit or pipe to the adapter 164A to enable fluid media L to be moved through the adapter 164A once the valve 22A is opened.

The adapter 164A has means for controlling the temperature thereof to thereby aid fluid flow therethrough and such means for controlling the temperature will now be described in detail. In particular, it will be seen that the means for controlling the temperature in the adapter 164A comprises a substantially tubular chamber 175A in such adapter, fluid inlet means 176A for the chamber, and fluid outlet means 177A for such chamber. The adapter 164A has means, designated schematically by a reference arrow 180A, for conveying a heat transfer fluid or liquid under pressure into the inlet means 176A such that the heat transfer fluid flows through the chamber 175A and out of the fluid outlet means 177A. As in the case of the fluid F which was previously described as being passed or moved through the heat exchange means 40 and 41 of the valve 22 the heat transfer fluid utilized in association with the adapter 164A is also heat transfer fluid or liquid which is also designated by the reference letter F and presented schematically by arrows F.

The means 180A for conveying the heat transfer fluid F under pressure may be any suitable pump and conduit system for conveying a heat transfer fluid. In those applications where it is desired to heat the adapter, steam, or the like, may be used. Likewise, in those applications where it is desired to cool the adapter a suitable cooling fluid such as cold water, or the like, may be provided through the chamber 175A.

Having described the overall function of the adapter 164A the description will now proceed with a description of the detailed structure thereof. In particular, the adapter comprises the previously mentioned mounting or base flange portion 167A which is provided with an annular groove 182A. The groove 182A is adapted to receive an annular projection 183A which extends from the body structure 31A. The flange portion 167A has a substantially right circular cylindrical tubular portion 184A suitably fixed thereto as by welding and the outer end of the tubular portion 184A has an annular disc 185A fixed thereto. The inner portion of the adapter 164A also has a frustoconical tubular portion 186A which has a large diameter end thereof fixed to the base flange 167A and a small diameter end thereof has a small diameter tubular member 187A suitably fixed thereto. The tubular portion 187A has an outside diameter which is smaller than the inside diameter of the tubular portion 184A thereby defining the chamber 175A therebetween. The tubular portion 186A extends in sealed relation through an opening in the disc 185A and the mounting flange 173A is fixed to the terminal outer end portion of the tubular portion 187A.

The fluid inlet means 176A provided in the adapter 164A is in the form of a tubular fitting which has an externally threaded outer end and an inner end which is aligned over an associated opening in the member 184A and suitably welded in position. Similarly, the fluid outlet means 177A is also in the form of a tubular fitting which has an externally threaded outer end and an inner end which is suitably welded in position over an associated opening in the member 184A. With this arrangement it will be seen that the adapter 164A is a simple structure which enables such adapter to be either heated or cooled to thereby promote the flow of fluid media L therethrough in a simple and unobstructed manner. It should be noted that the fittings 176A and 177A are at opposite ends of the chamber and at positions 180 degrees apart on the cylindrical outside surface of member 184A to provide flow of fluid through the full length of the chamber 175A.

The valve assembly 22A also has an actuating handle 155A which is similar to the actuating handle 155 of the valve assembly 22. It will also be noted that the handle 155A has an opening 171A therein which is provided for the same purpose as opening 171 of handle 155.

The valve assembly 22B of FIGS. 10–13 of the drawings is substantially identical to the valve assembly 22 with the exception that the valve assembly 22B is not provided with annular heat exchange means which correspond to the heat exchange means 40 and 41 of the valve assembly 22. Accordingly, it will be seen from FIGS. 12 and 13 that the body structure 31B is free of passage means defining annular heat exchange means therein. Similarly the disc or structure 35B and its stems 37B are free of passages and the like. Thus, the valve assembly 22B is free of heating and/or cooling means therefor and for its seal means.

Figure 11:
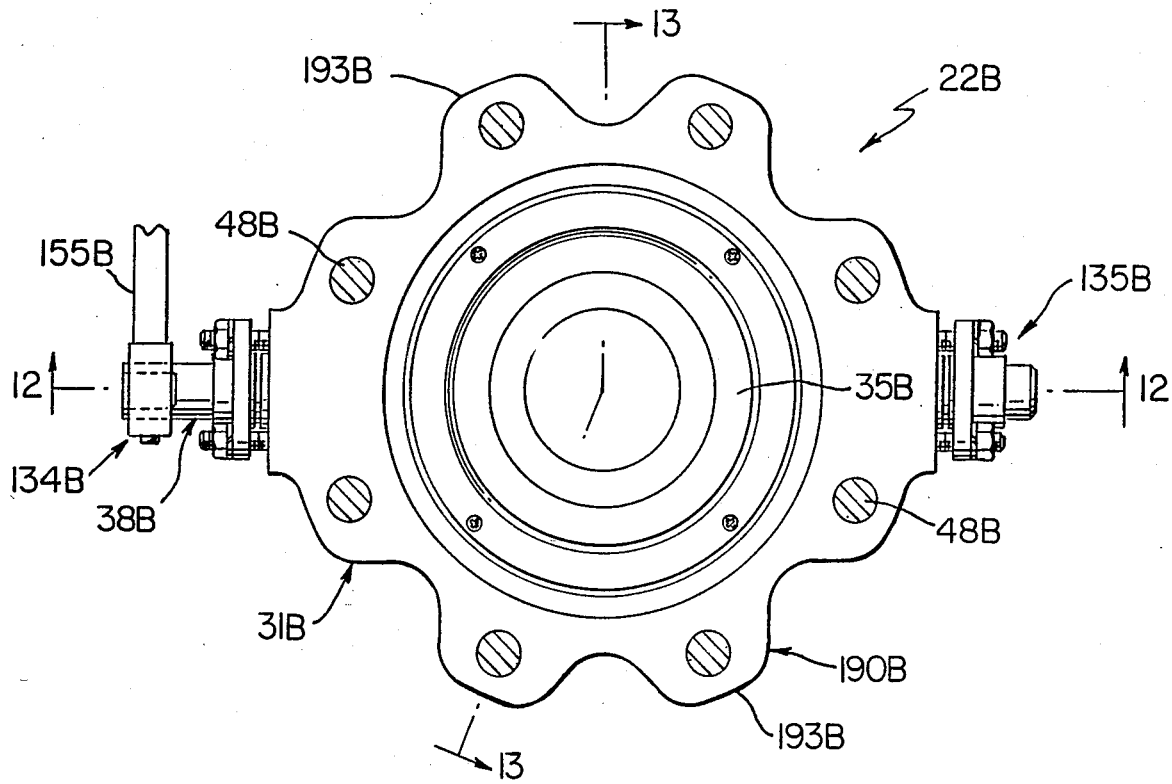
FIG. 11 is a view taken essentially on the line 11—11 of FIG. 10.
Figure 12:
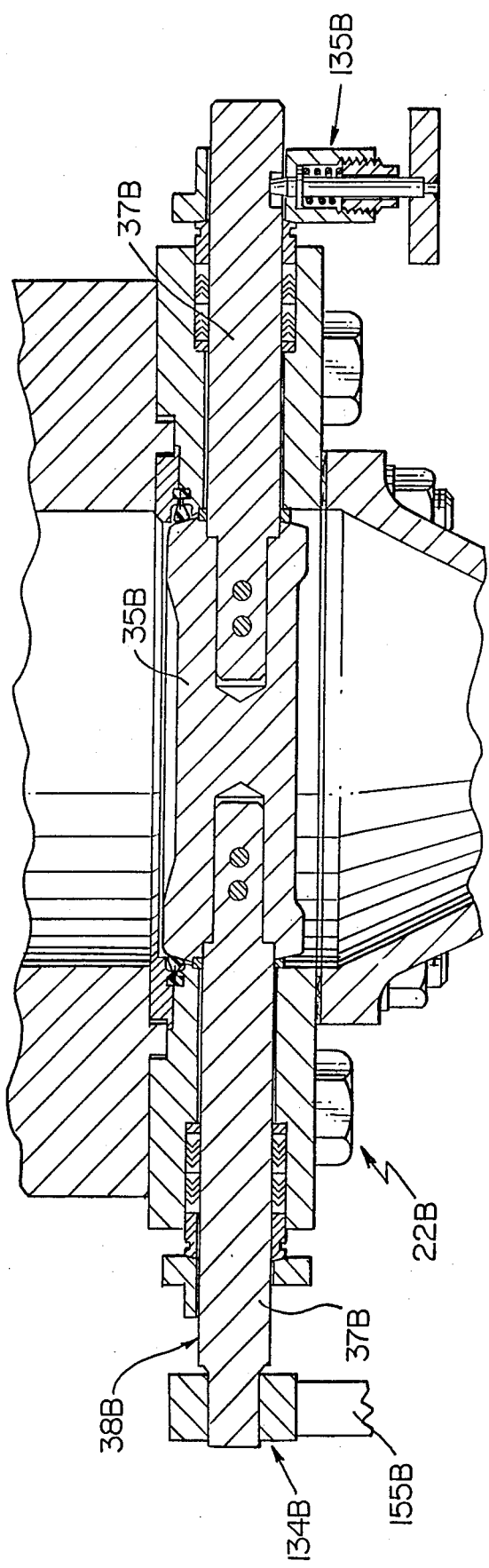
FIG. 12 is a primarily cross-sectional view with portions broken away taken essentially on the line 12—12 of FIG. 11.
Figure 13:
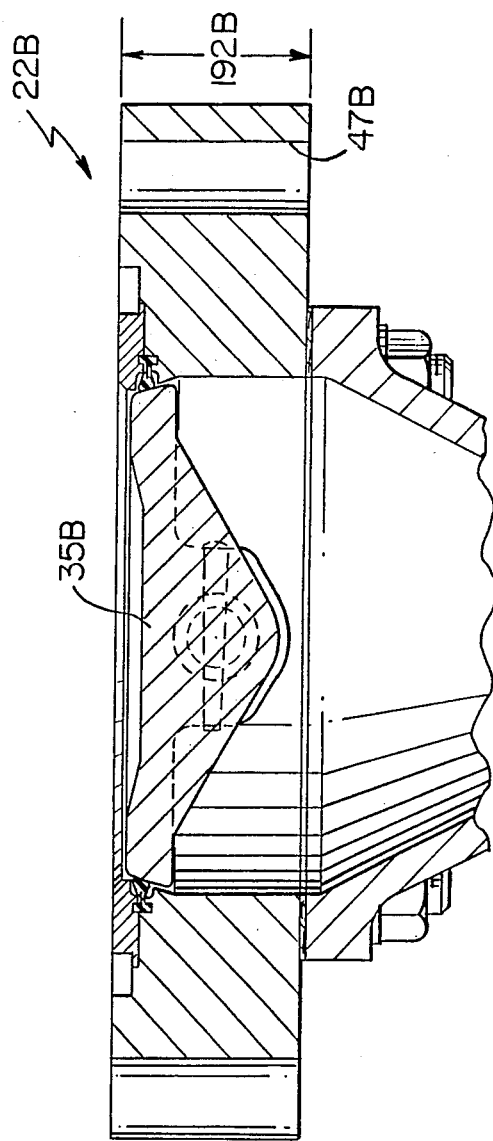
FIG. 13 is a primarily cross-sectional view with portions broken away taken essentially on the line 13—13 of FIG. 11.

The body structure 31B of the valve 22B has a scalloped outline 190B as shown in FIG. 11 and such outline 190B extends about substantially its entire periphery, except where structure is provided for the shaft means 38B to extend therethrough. The scalloped or undulating outline 190B extends across the full width of the valve body structure as will be apparent from the width 192B shown in FIG. 13. The scalloped outline 190B results in the valve assembly 22B being comparatively lighter than the valve assembly 22. Further, the outwardly projecting parts 193B of the scalloped outline have bores 47B therein which receive associated threaded bolts 48B for the purpose of mounting the valve assembly 22B in position in a similar manner as previously described for the valve assembly 22.

The valve assembly 22B also has actuating means 134B at one end of its shaft means 38B, as shown in FIG. 11, and locking means 135B (also shown in FIG. 12) at the opposite end of such shaft means 38B. The locking means 135B is identical to the previously described locking means 135 comprising the valve assembly 22 whereby the previous detailed description is fully applicable and will not be repeated for the locking means 135B. As in the case of the valve assembly 22 the locking means 135B is disposed on the shaft means 38B at a location which is in spaced relation and quite remote from the actuating means 134B. This arrangement prevents inadvertent release of the locking means and requires positive action before moving the actuating means 134B.

Figure 16:
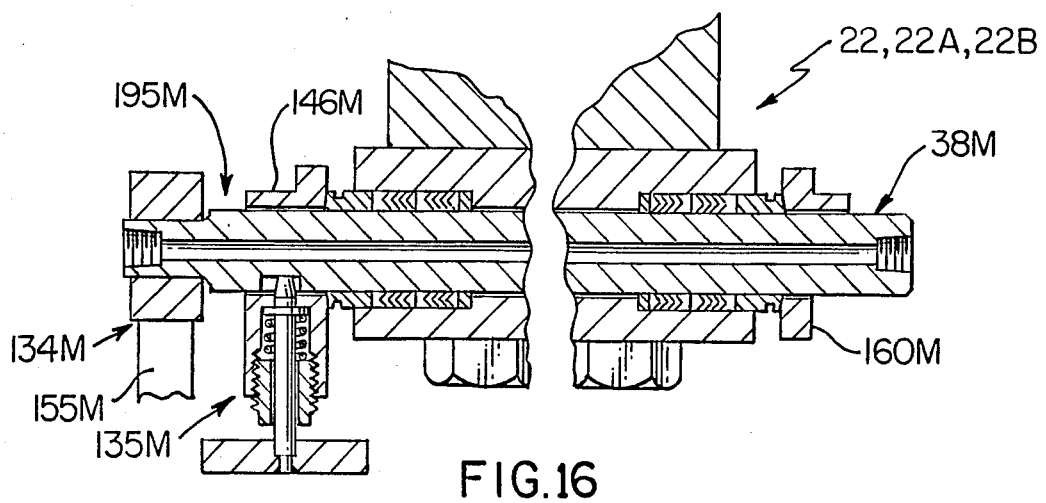
FIG. 16 is a view of a modification of the valve of this invention showing the locking means and actuating means at the same end of the shaft means.

Having described the above embodiments of the butterfly valve assembly of this invention it will be seen that in each of these embodiments the locking means thereof is provided in spaced relation at a remote location from the actuating means. Indeed a maximum dimension of the valve assembly or body structure separates the two. However, it will be appreciated that the locking means need not necessarily be provided at opposite ends or opposite end portions of its shaft means and the presentation of FIG. 16 of the drawings shows a modification of a valve assembly wherein locking means 135M may be provided at the same end of the shaft means 38M as the actuating means 134M, yet in spaced relation and as shown at 195M. This arrangement may be provided on the valve assembly 22, 22A or 22B whereby the fragmentary portion of the valve shown in FIG. 16 is designated 22, 22A, and 22B to indicate this fact even though technically valve 22B does not have passages through its stems.

Thus, it is seen that the actuating handle 155M of actuating means 134M is provided closely adjacent the locking means on the shaft means 38M. It will be appreciated that the locking means 135M with all its components is identical to the previously described locking means 135. Likewise, the actuating means 134M and actuating handle 155M are identical to the previously described actuating means 134 and 155 respectively. The only variation that would be required in the modification of FIG. 16 would be that the supporting means 146M comprising the locking means 135M now associates with the same stem as the stem which has the actuating handle 155M thereon. The member 160M is provided on the opposite stem.

It should also be appreciated that each locking means 135, 135A, 135B, or 135M provides its locking action with minimum weakening of its associated shaft means. Yet a positive locking action is always provided.

Still other exemplary embodiments of the valve assembly of this invention are illustrated in FIGS. 17–20, 21–23, 24–28, and 29–30. The valve assemblies illustrated in FIGS. 17–20, 21–23, 24–28, and 29–30 are similar to the valve assembly 22; therefor, in a similar manner as described in connection with the valve assemblies 22A and 22B, such valve assemblies will be designated generally by the reference numerals 22C, 22D, 22E, and 22F respectively and representative parts of each valve assembly which are similar to corresponding parts of valve assembly 22 will be designated in the drawings by the same reference numerals as in the valve assembly 22 (whether or not such representative parts are mentioned in the specification) followed by the associated letter designation, either C, D, E, or F, and not described again in detail. Only those component parts of each valve assembly 22C, 22D, 22E, and 22F which are substantially different from corresponding parts of the valve assembly 22 will be designated by a new reference numeral also followed by the associated letter designation and described in detail. Further, those parts of valve assemblies 22C through 22F not designated by a new reference numeral and not described in detail or designated by any reference numeral yet which are very similar to parts previously shown and described are understood to be covered by the previous detailed description thereof and their corresponding reference numerals.

The butterfly valve assembly 22C of FIGS. 17–20 is very similar to the valve assembly 22 shown in FIG. 1 and is shown minus a valve supporting flange which would correspond to the flange 25 of valve assembly 22.

The valve assembly 22C comprises a valve body structure 31C and such body structure has a fluid flow passage 32C and first sealing surface means in the form of a sealing surface 33C. The valve 22C also has a closure structure in the form of a closure disc 35C which has second sealing surface means in the form of a sealing surface 36C which is adapted to engage the first sealing surface 33C to prevent fluid flow through the passage 32C and thereby shut off fluid flow through the valve 22C.

The disc 35C has shaft means designated generally by the reference numeral 38C and such shaft means is defined by a pair of shaft stems 37C fastened to the disc 35C and which extend through the body structure 31C in fluid-tight relation. The shaft means 38C and hence shaft stems 37C have a central longitudinal axis 39C.

The valve assembly 22C also has actuating means 134C for moving the shaft means 38C and closure disc between the closed position and open position thereof. The valve assembly 22C also has locking means designated generally by the reference numeral 135C for locking the shaft means 38C and closure structure or disc 35C in its closed position.

As best seen in FIG. 20, the locking means 135C of this exemplary embodiment comprises a locking member 200C supported by the body structure 31C and such locking member 200C has a slot 201C therein. The actuating means 134C comprises an actuating handle 155C and such actuating means also comprises a pivoted lever 202C having a locking end 203C which is adapted to be pivoted into the slot 201C once the actuating means 134C and hence actuating handle 155C is in its closed position and such closed position also defines the closed position of the valve assembly 22C. Once the locking end 203C is in slot 201C there is a locking of the actuating means and hence the shaft means 38C in its closed position.

The valve assembly 21C also comprises a bracket 204C in the form of a roughly U-shaped bracket and such bracket has a bight 205C and a pair of legs, each designated by the same reference numeral 206C, extending from opposite ends of the bight in parallel relation. The legs 206C have a pair of extensions 207C extending from the outer ends thereof toward each other and the bracket 204C is detachably fastened to the body structure 31C by detachably fastening the extensions 207C thereto. A plurality of threaded bolts 210C are used to attach the bracket 204C in position and such bolts are threadedly fastened within associated threaded openings 211C in the body structure 31C.

Figure 19:
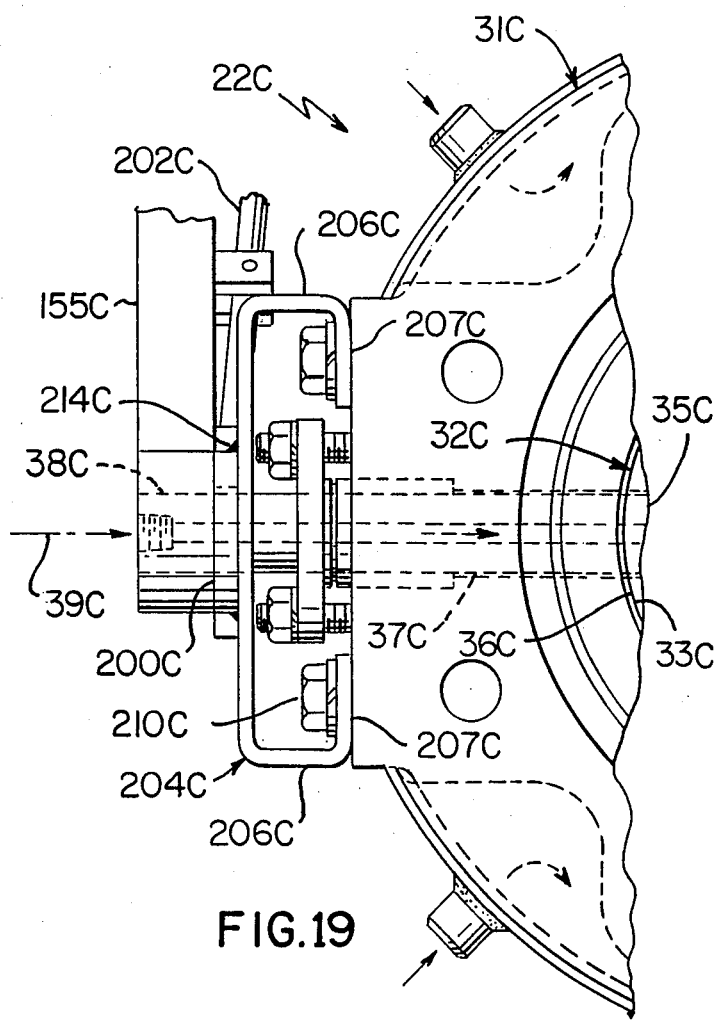
FIG. 19 is a fragmentary view taken essentially on the line 19—19 of FIG. 17.

The bight 205C also has a cutout 212C for receiving one end of the shaft means 38C therethrough and the locking member 200C is essentially an annular member having an opening 213C therein for receiving one end of the shaft means 38C therethrough. The locking member 200C is fixed to the bight 205C by any suitable means such as by weld 214C, or the like, as shown in FIG. 19; and, it will be seen that the slot 201C extends substantially radially inwardly from the outer periphery of the annular locking member 200C.

Referring again to FIG. 17 of the drawings, it will be noted that the actuating handle 155C is a manually operable handle and the pivoted lever 202C has a central portion 215C pivotally fastened to the handle 155C to enable pivoting of the locking end 203C in and out of the slot 201C so that it engages an appropriate surface 216C which partially defines such slot 201C to provide a locking action. Although the pivoted lever 202C may be made of any suitable material, and may be of any desired shape, in this example of the invention such lever is preferably in the form of a pivoted rectilinear metal rod.

Figure 17:
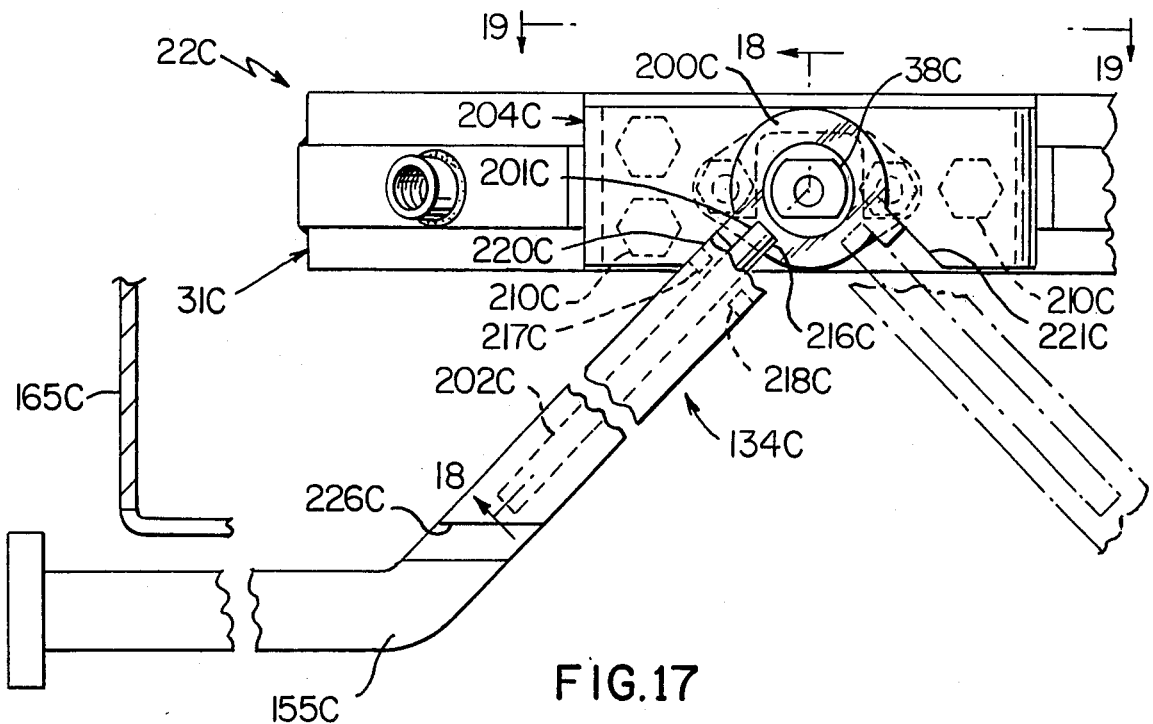
FIG. 17 is a view of another exemplary embodiment of the butterfly valve assembly of this invention oriented in the manner such valve would be mounted at the bottom of an associated tank car yet detached from associated mounting flanged therefor; and particularly illustrating a new device for locking, in its closed position, a shaft assembly which is used to operate the closure structure for such valve assembly.
Figure 18:
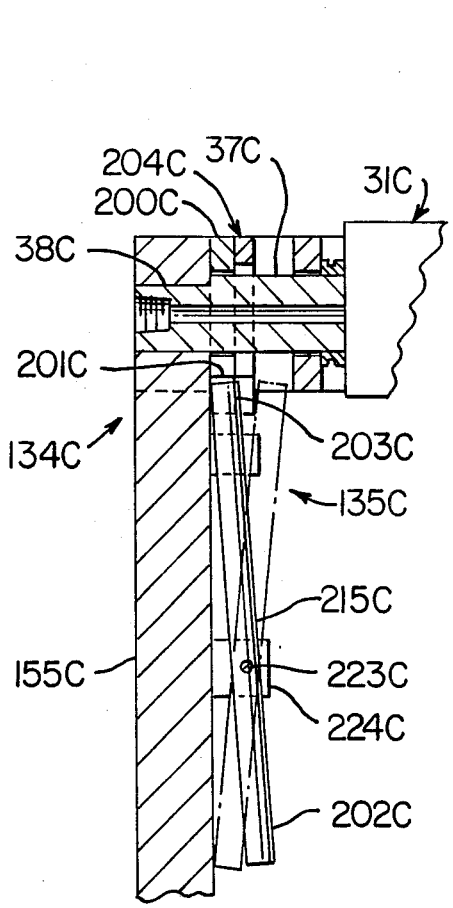
FIG. 18 is a view taken essentially on the line 18—18 of FIG. 17.

As also seen in FIG. 17, the handle 155C has stop means in the form of a pair of stops 217C and 218C. The stops 217C and 218C may be fixed in position against the handle by welding, or the like, or the handle may be a single piece construction with the stops 217C and 218C protruding therefrom.

The stop 217C serves to stop movement of the handle 155C once the shaft means 38C has been moved to the closed position by engaging an inclined stop edge 220C of the bight 205C which helps define cutout 212C. Similarly, the stop 218C serves to stop movement of the handle 155C once the shaft means 38C has been moved to the open position by engaging an inclined stop edge 221C of the bight 205C which helps define the opposite side of cutout 212C.

The valve assembly 22C may also comprise means for holding the pivoted lever 202C with its locking end 203C in the locking slot 201C and such means may be achieved by friction between a pivot pin 223C, lever 202C, and lug means 224C provided on the handle 155C. In addition to or in lieu of the above friction, the means holding the locking end 203C in the slot 201C may also be in the form of side surface means defined by the inside facing surfaces of the stops 217C and 218C and such surface means may frictionally engage the pivoted lever 202C once it is pivoted in position within the slot 201C to hold the lever firmly in position.

The valve assembly 22C is similar to the valve assembly 22, as previously described, and the valve assembly 22C is used in association with a ramp-like assembly 165C which is fixed to an associated railway tank car by suitable means (not shown) in accordance with the AAR specification previously mentioned. The bottom surface of the assembly 165C defines a shear plane.

The handle 155C has weakening means in the form of a weakening cutout 226C. The weakening means 226C is provided in the handle 155C such that with such handle in its closed position the weakening means 226C is adjacent the shear plane defined by the bottom surface of the ramp-like assembly 165C whereby in the event shearing forces are applied against the outer end portion of the handle 155C in a direction essentially parallel to the axis of rotation of such handle 155C, and in particular the shaft means 38C to which such handle is attached, shearing of the handle will occur adjacent the weakening means 226C and substantially coplanar with such shear plane.

As previously mentioned the pivoted lever 202C is in the form of a rectilinear rod and it will be seen that such rod is disposed inwardly of the weakening means 226C and hence inwardly of the shear plane defined by the bottom surface of the ramp-like assembly 165C. With this construction and arrangement the handle 155C may be readily sheared under the conditions anticipated without interference by the rod 202C.

Thus, it is seen that the butterfly valve 22C has locking means 135C which provides a positive locking action and yet such locking means is simple to operate.

Figure 21:
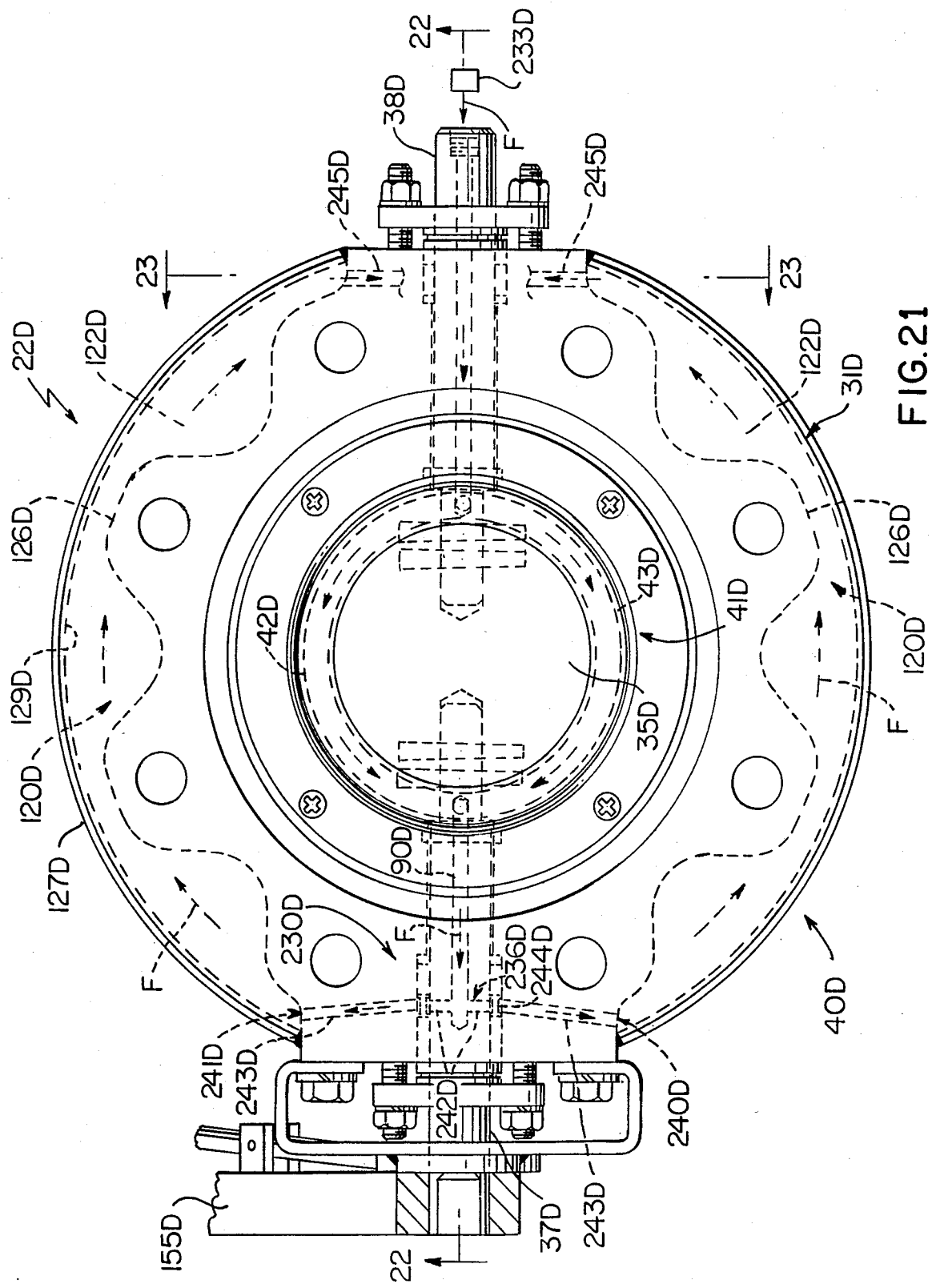
FIG. 21 is a view similar to FIG. 2 and drawn to an enlarged scale illustrating another exemplary embodiment of the valve assembly of this invention.

The butterfly valve assembly 22D of FIGS. 21-23 comprises a valve body structure 31D having a fluid flow passage 32D therethrough and first sealing surface means in the form of a sealing surface 33D. The valve assembly 22D also has a closure structure in the form of a closure disc 35D for controlling fluid flow through the passage 32D; and, such closure structure 35D has second sealing surface means in the form of a sealing surface 36D which is adapted to engage the first sealing surface 33D to prevent fluid flow through the passage 32D and valve 22D and thus define the closed position of the closure structure 35D.

The valve assembly 22C has suitable means for mounting the body structure 31D on a supporting flange therefor and shaft means 38D fastened to the closure structure or disc 35D and extending through the body structure 31D in fluid-tight relation. The valve assembly also has actuating means 134D including an actuating handle 155D and the actuating means 134D is provided for moving the shaft means 38D and closure disc 35D between its closed position and an open position thereof.

The valve assembly 22D comprises first substantially annular heat exchange means 40D in the body structure 31D for controlling the temperature of the major portion of such body structure. The first heat exchange means 40D comprises the outer periphery of the body structure 31D and has practically the entire valve assembly 22D within the confines thereof. Except for certain features to be discussed herein the first heat exchange means 40D is substantially identical to the heat exchange means 40 previously described in connection with the valve assembly 22. Nevertheless, certain key portions of the heat exchange means 40D will now be further described herein for emphasis.

In particular, it will be seen that the heat exchange means 40D comprises a pair of arcuate heat exchange devices each designated by the same reference numeral 120D and such devices are basically crescent shaped and disposed on opposite sides of the shaft means 38D. Each of the heat exchange devices 120D comprises a fluid flow channel 122D in the body structure 31D for receiving a heat transfer or heat exchange fluid therethrough and such fluid is also designated by the reference letter F.

Each of the heat exchange devices 120D has its channel 122D defined, in part, by a pair of parallel spaced apart planar side surfaces, each designated by the same reference numeral 123D (FIG. 23). Each of the heat exchange devices 120D also has an undulating innermost surface 126D and a substantially semicylindrical outer surface defined by the inside surface 129D of a semicylindrical band 127D which comprises the valve assembly 22D. Each semicylindrical outer surface 129D is disposed concentrically around the undulating surface 126D and the surfaces 126D and semicylindrical outer surface 129D define opposed essentially radially spaced apart surfaces of an associated flow channel. The undulating surface 126D is effective in providing a turbulent action and more efficient heat transfer through such undulating surface to the body structure 31D.

The valve assembly 22D has second substantially annular heat exchange means 41D which comprises conduit means 42D in the disc 35D and such conduit means is in the form of a substantially annular groove means or groove 43D and an annular plate 44D which is suitably fixed in sealed relation over the groove 43D by suitable welds. The substantially annular heat exchange means 41D is adapted to receive a heat transfer fluid F therethrough for controlling the temperature of the outer portion of the closure structure or disc 35D and also the temperature of the sealing surface means or sealing surface 36D of such disc.

As seen in FIG. 21, the valve 22D has a single heat transfer fluid source, indicated generally at 230D, for both of its arcuate heat exchange devices 120D of its first heat exchange means 40D.

The valve assembly 22D has means providing heat transfer fluid through the first and second heat exchange means 40D and 41D respectively and in this exemplary embodiment of the invention such means comprises a sole inlet connection 232D. The sole inlet connection may be provided with heat transfer fluid F from any suitable supply known in the art and such supply is indicated schematically by a rectangular figure 233D. The sole inlet connection 232D is provided at one end of the valve assembly 22D and serves as the sole inlet for heat transfer fluid F to the second heat exchange means 41D and to the single heat transfer fluid source 230D.

The means providing heat transfer fluid F also comprises a sole outlet connection 234D for heat transfer fluid F exiting the valve assembly 22D and as shown in FIG. 22. In this example of the invention, the sole outlet connection 234D is at the same end of the valve assembly 22D as the sole inlet connection 232D and as shown at 235D in FIG. 22.

Referring again to FIG. 21 of the drawings it will be seen that the single heat transfer fluid source 230D for both of the arcuate heat exchange devices 120D comprises first fluid bore means 236D in end portion of the body structure 31D opposite from the same end mentioned above and shown at 235D. The first fluid bore means 236D comprises a plurality of cooperating bores in fluid flow communication with the axial bore 90D of an associated stem 37D comprising the shaft means 38D. The bore means 236D is in fluid flow communication with heat transfer fluid F exiting the heat exchange means 41D and with the arrangement of valve assembly 2D such bore means is such that heat transfer fluid F flows first in one direction through the valve assembly 22D, i.e., to the left as shown in FIG. 21, and then in a diametrically opposite direction, i.e., to the right as shown in FIG. 21; whereby fluid F enters and exits the valve assembly 22D at the same end.

The fluid F exiting the heat exchange means 41D, in essence, splits or is separated into two paths shown as paths 240D and 241D in FIG. 21. The fluid F in each path 240D or 241D flows along the undulating surface 126D of its associated arcuate heat exchange device 120D providing improved heat transfer through such surface 126D to the body structure 31D. The fluid F from both paths 240D and 241D is then combined at the fluid outlet connection 234D.

As also seen in FIG. 21 the fluid bore means 230D is provided in the left hand portion of the body structure 31D. The bore means 230D comprises a pair of transverse bores 242D in the left stem 37D which communicates with the axial bore 90D of such stem. The bore means 230D also comprises a pair of bores 243D in the body structure 31D and annular passage and seal means 244D between each set of bores 242D-243D. In this manner each bore 242D communicates with an associated bore 243D and heat transfer fluid F is provided to an associated heat exchange device 120D and along path 240D or 241D as the case may be. Each annular passage and seal means 244D may be of any suitable type known in the art which is capable of providing fluid F from a bore 242D in the rotatable stem 37D to an associated bore 243D.

Referring now to FIG. 23 of the drawings, it will be seen that the means providing heat transfer fluid through the first and second heat exchange means 40D and 41D respectively also comprises a pair of converging bores, each designated by the same reference numeral 245D, in the body structure 31D. Each of the converging bores 245D has its inlet end in fluid flow communication with an associated arcuate heat exchange device 120D and each bore 245D has its opposite or outlet end in fluid flow communication with the sole outlet connection 234D. The connection 234D of this example comprises an outlet fitting which is fixed in fluid tight relation to the body structure 31D by any suitable means, such as a weld, and such outlet fitting is an internally threaded pipe fitting.

Thus, the valve assembly 22D has a single inlet connection for heat transfer fluid F and a single outlet connection for such fluid, both at the same end of the valve assembly 22D. The heat transfer fluid F flows into the valve assembly 22D, then flows through the heat exchange means 41D to the outlet end of such heat exchange means, then enters the inlet portion of the heat exchange means 40D, and finally then flows in a counterflow direction to the flow of fluid through the heat exchange means 41D before it exits the valve assembly 22D through the outlet connection 234D.

The valve assembly 22E illustrated in FIGS. 24-28 has a sole inlet connection 232E for receiving heat transfer fluid F and the flow of fluid through the heat exchange means 40E and 41E is identical to the flow of fluid through the heat exchange means 40D and 41D of the valve assembly 22D. However, the main difference is in the provision of external conduit means for receiving the fluid F exiting the heat exchange devices 120E; and, such external conduit means is designated generally by the reference numeral 246E. The conduit means 246E has inlet means 247E in fluid flow communication with each arcuate heat exchange device 120E and outlet means in fluid flow communication with the sole outlet connection which in this example is disposed in spaced relation from body structure 31E and is also designated by the reference numeral 234E to correspond to the designation of the outlet connection 234D of the valve assembly 22D.

As seen typically in FIG. 27, each inlet means 247E comprises a discharge bore 248E in the body structure 31E and each discharge bore 248E is in fluid flow communication with an associated arcuate heat exchange device 120E while extending perpendicularly through an associated outside surface 251E of the body structure 31E.

The conduit means 246E is, in essence, a pipe system also referred to as pipe system 246E and such pipe system comprises cooperating pipes 252E, fittings 253E, and connectors 254E connected between the perpendicular discharge bores 248E and the sole outlet connection 234E. The pipes 252E will be designated by the reference numeral 252E regardless of the length thereof, the fittings will be designated by the reference numeral 253E regardless of their placement and location, and the connectors will be designated by the reference numeral 254E regardless of their placement or configuration.

Thus, it is seen that the valve assembly 22E, in essence, provides for the same pattern of fluid flow of heat transfer fluid F therethrough as the valve assembly 22D with the exception that the fluid F instead of exiting the arcuate heat exchange devices through internal converging bores which communicate with a sole outlet fitting exits the arcuate heat exchange devices 120E through an external conduit means or external pipe system 246E.

Figure 29:
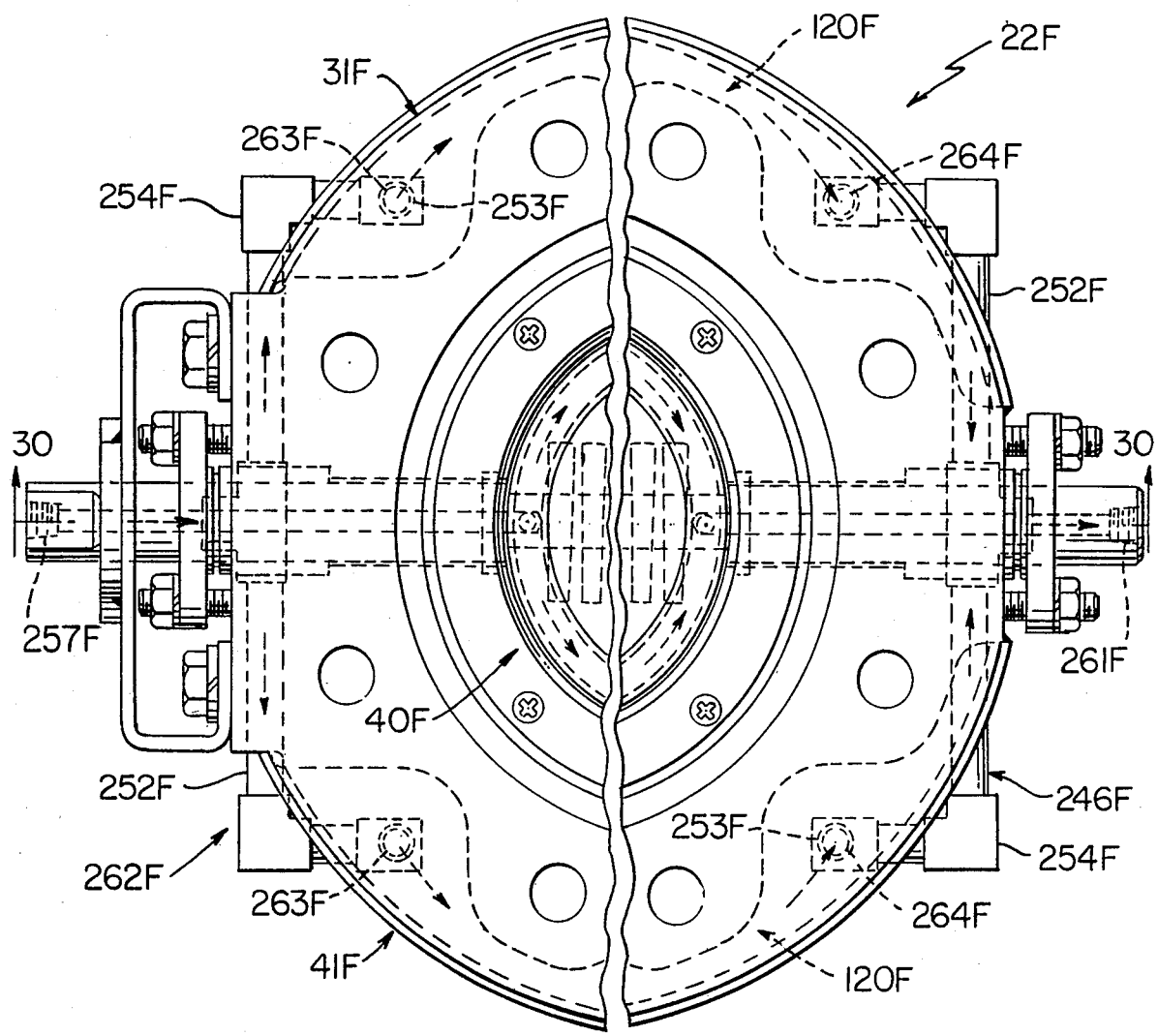
FIG. 29 is a view similar to FIG. 21 with the central portion thereof broken away illustrating another exemplary embodiment of the valve assembly of this invention.
Figure 30:
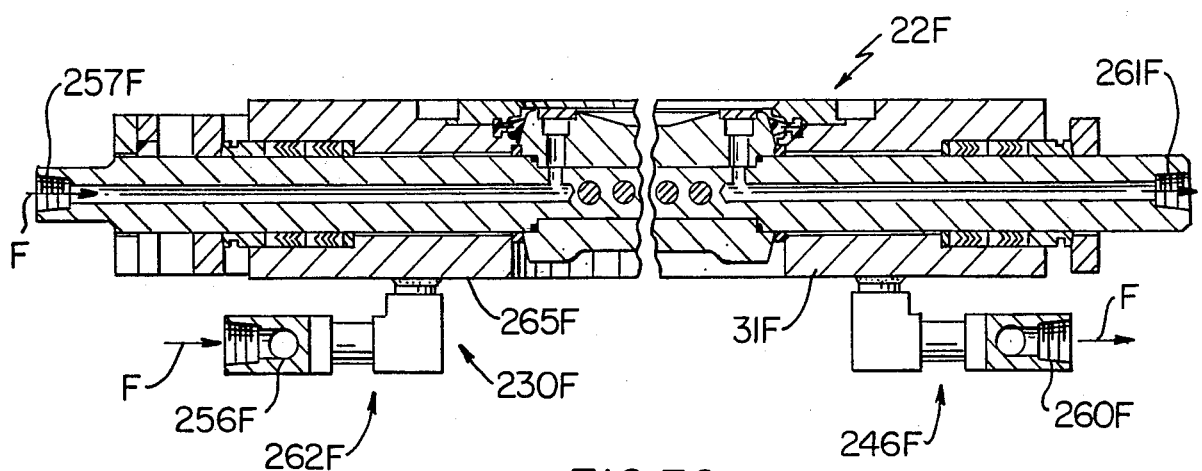
FIG. 30 is a fragmentary cross-sectional view taken essentially on the line 30—30 of FIG. 29.

The valve assembly 22F of FIGS. 29-30 comprises a first external inlet connection 256F, i.e., external of the body structure 31E, which defines the single heat transfer fluid source 230F for the arcuate heat exchange devices 120F of the heat exchange means 40F and a second inlet connection 257F for receiving heat transfer fluid F for the second heat exchange means 41F.

The means providing heat transfer fluid F also comprises a third outlet connection 260F for receiving heat transfer fluid F from the arcuate heat exchange devices 120F of heat exchange means 40F and a fourth outlet connection 261F for receiving heat transfer fluid F from the second heat exchange means 41F.

The means providing heat transfer fluid F comprises first conduit means 262F having inlet means in fluid flow communication with the first inlet connection 256F and outlet means in flow communication with the arcuate heat exchange devices 120F. The first inlet conduit means 262F is similar to the outlet conduit means 246E of the valve 22E and thus will not be described in detail. However, it will be seen that such conduit means 262F comprises a first pipe system disposed substantially externally of the body structure 31F.

The means providing heat transfer fluid also comprises second conduit means 246F substantially identical to the conduit means 246E of the valve assembly 22E. The conduit means 246F comprises a pipe system also designated by the reference numeral 246F disposed substantially externally of the body structure 31F.

As will be apparent from FIG. 29, each of the inlet means in flow communication with an associated arcuate heat exchange device 120F is defined by an inlet bore 263F in structure 31F and each outlet means is defined by an associated outlet bore 264F in such body structure 31F. Each of the bores 263F and 264F extends perpendicularly through an associated outside surface 265F, as seen in FIG. 30, of the body structure 31F.

Each of the first and second pipe systems 262F and 246F comprises cooperating pipes 252F, fittings 253F, and connectors 254F which in each instance are substantially identical to the pipes and connectors previously described and comprising the conduit means or pipe system 246E of the valve assembly 22E. Such pipes, fittings, and connectors will not be further described with the understanding that the description previously made for such components of the pipe systems 246E is fully applicable for the external outlet pipe system 246F of the valve assembly 22F as well as the external inlet pipe system 262F of the valve assembly 22F.

Thus, it is seen that the valve assembly 22F has two independent systems for providing heat transfer fluid F therethrough. The first system which has inlet connection 257F and outlet connection 261F provides heat transfer fluid through the heat exchange means 41F. The second system which has inlet connection 256F and outlet connection 260F provides heat transfer fluid through the heat exchange means 40F. This second system is basically an external conduit system comprised of cooperating pipes, fittings, and connectors suitably connected together and to and from the arcuate heat exchange devices 120F.

The means providing heat transfer fluid F through the first and second heat exchange means of the valve assemblies 22D, 22E, and 22F are different from the means providing such heat transfer fluid through the first and second heat exchange means of the valve assembly 22, for example. In particular, it will be seen that in the valve assembly 22 heat transfer fluid is provided for the heat exchange means 41 through an inlet flexible conduit 103 and an outlet flexible conduit also designated by the reference numeral 103. However, the fluid through the heat exchange means 40 and in particular the arcuate heat exchange devices 120 is provided by a separate external inlet for each arcuate heat exchange device 120 and a separate outlet. Accordingly, in valve assembly 22 fluid F is supplied through three inlets thereto and such fluid exits from three outlets from such valve assembly 22.

Thus, it is seen that in accordance with the teachings of this invention a unique butterfly valve assembly and method of making same are provided. The butterfly valve assembly of this invention may be used in numerous applications. However, it is particularly adapted to be used as a lading valve for a railway tank car.

Each exemplary valve presented herein preferably uses a fluid F for heating and/or cooling of its associated body structure and its valve closure structure. Further, in each instance locking means which may be substantially identical to any one of the disclosed locking means would be provided.

Each exemplary butterfly valve disclosed herein may utilize a fluid F which is either a liquid, a gas, or mixture of liquid and gas for the purpose of providing controlled heating or cooling of its associated sealing surface means or sealing surface and valve parts. In certain applications steam is preferred for heating purposes.

The fluid F circulated through each valve of this invention may be provided from any suitable source or sources (not shown) and preferably under pressure using a suitable pump, or the like. The fluid F in valve assembly 22 may be provided to the left stem as shown in FIG. 7 and is discharged out of the right stem. Likewise, the fluid F for the body structure flows from left to right.

The flow of fluid F in each valve assembly may be controlled in temperature using any suitable means for controlling the temperature of such fluid as is known in the art; and, the fluid F may be heated to a controlled temperature or cooled to a controlled temperature depending on the application.

Each valve disclosed herein may be actuated by rotating or pivoting a stem thereof as is known in the art. Further, it may also be desirable to provide stops, or the like, (not shown in all instances) for limiting rotation of each stem and hence each disclosed valve disc.

The various seals, packing rings, and the like used in each embodiment of the valve of this invention may be made of suitable materials known in the art provided that such materials are compatible with the construction of each associated valve, the temperature of the environment of each valve, and the temperature of the media L being controlled by each valve.

In this disclosure of the invention use has been made of terms such as right, left, inner, outer, and the like. However, it is to be understood that these terms are used to describe various valve components as illustrated in the drawings and such terms are not to be considered limiting in any way.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a butterfly valve assembly comprising a valve body structure having a fluid flow passage therethrough and first sealing surface means, a closure structure for controlling fluid flow through said passage, said closure structure having second sealing surface means adapted to engage said first sealing surface means to prevent fluid flow through said passage and define the closed position of said closure structure, means for mounting said body structure on a supporting flange therefor, shaft means fastened to said closure structure and extending through said body structure in fluid-tight relation, actuating means for moving said shaft means and closure structure between said closed position and an open position thereof, first substantially annular heat exchange means in said body structure for controlling the temperature of a major portion of said body structure, said first heat exchange means comprising the outer periphery of said body structure and having practically the entire valve assembly within the confines thereof, said first heat exchange means comprising a pair of arcuate heat exchange devices each having a separate fluid flow channel adapted to receive a heat transfer fluid therethrough, said pair of arcuate heat exchange devices serving to control said temperature of said major portion of said body structure and also the temperature of said first sealing surface means, said first heat exchange devices having opposite ends in close proximity to said shaft means, each of said heat exchange devices having an undulating innermost surface comprising said body structure and a substantially semicylindrical outer surface disposed concentrically therearound with said innermost and outer surfaces of each heat exchange device defining opposed surfaces of its associated flow channel, each of said undulating surfaces being effective in providing a turbulent action and more efficient heat transfer therethrough to said body structure, second substantially annular heat exchange means in said closure structure, said second heat exchange means being adapted to receive a heat transfer fluid therethrough for controlling the temperature of the outer portion of said closure structure and also the temperature of said second sealing surface means thereof, and means providing heat transfer fluid through said first and second heat exchange means, the improvement wherein said means providing heat transfer fluid comprises a single heat transfer fluid source for both of said arcuate heat exchange devices of said first heat exchange means.

2. In a butterfly valve assembly comprising a valve body structure having a fluid flow passage therethrough and first sealing surface means, a closure structure for controlling fluid flow through said passage, said closure structure having second sealing surface means adapted to engage said first sealing surface means to prevent fluid flow through said passage and define the closed position of said closure structure, means for mounting said body structure on a supporting flange therefor, shaft means fastened to said closure structure and extending through said body structure in fluid-tight relation, actuating means for moving said shaft means and closure structure between said closed position and an open position thereof, first substantially annular heat exchange means in said body structure for controlling the temperature of a major portion of said body structure, said first heat exchange means comprising the outer periphery of said body structure and having practically the entire valve assembly within the confines thereof, said first heat exchange means comprising a pair of arcuate heat exchange devices each having a separate fluid flow channel adapted to receive a heat transfer fluid therethrough, said pair of arcuate heat exchange devices serving to control said temperature of said major portion of said body structure and also the temperature of said first sealing surface means, said first heat exchange devices having opposite ends in close proximity to said shaft means, each of said heat exchange devices having an undulating innermost surface comprising said body structure and a substantially semicylindrical outer surface disposed concentrically therearound with said innermost and outer surfaces of each heat exchange device defining opposed surfaces of its associated flow channel, each of said undulating surfaces being effective in providing a turbulent action and more efficient heat transfer therethrough to said body structure, second substantially annular heat exchange means in said closure structure, said second heat exchange means being adapted to receive a heat transfer fluid therethrough for controlling the temperature of the outer portion of said closure structure and also the temperature of said second sealing surface means thereof, and means providing heat transfer fluid through said first and second heat exchange means, the improvement wherein said means providing heat transfer fluid comprises a single heat transfer fluid source for both of said arcuate heat exchange devices of said first heat exchange means, and said means providing heat transfer fluid further comprises a sole inlet connection for heat transfer fluid at one end of said valve assembly, said sole inlet connection serving as the sole inlet for heat transfer fluid to said second heat exchange means and to said single heat transfer fluid source.

3. A valve assembly as set forth in claim 2 in which said means providing heat transfer fluid comprises a sole outlet connection for heat transfer fluid exiting said valve assembly.

4. A valve assembly as set forth in claim 3 in which said sole outlet connection is at the same end of said valve assembly as said sole inlet connection.

5. A valve assembly as set forth in claim 4 in which said single heat transfer fluid source for both of said arcuate heat exchange devices comprises first fluid bore means in the end portion of said body structure opposite from said same end, said first fluid bore means being in flow communication with heat transfer fluid exiting said second heat exchange means so that said heat transfer fluid flows first in one direction through said valve assembly and then in a diametrically opposite direction entering and exiting said valve assembly at said same end.

6. A valve assembly as set forth in claim 3 in which said means providing heat transfer fluid comprises a pair of converging bores in said body structure, each of said converging bores being in flow communication at one end with an associated arcuate heat exchange device and at its opposite end with said sole outlet connection.

7. A valve assembly as set forth in claim 6 in which said sole outlet connection comprises an outlet fitting fixed in fluid-tight relation to said body structure.

8. A valve assembly as set forth in claim 3 in which said means providing heat transfer fluid further comprises external conduit means having inlet means in flow communication with said arcuate heat exchange devices and outlet means in flow communication with said sole outlet connection.

9. A valve assembly as set forth in claim 8 in which said inlet means comprises a pair of discharge bores in said body structure, each of said discharge bores being in flow communication with an associated arcuate heat exchange device while extending perpendicularly through an associated outside surface of said body structure.

10. A valve assembly as set forth in claim 9 in which said external conduit means comprises a pipe system disposed externally of said body structure.

11. A valve assembly as set forth in claim 10 in which said pipe system comprises cooperating pipes, fittings, and connectors connected between said perpendicular discharge bores and said sole outlet connection.

12. A valve assembly as set forth in claim 2 in which said means providing heat transfer fluid comprises a first external inlet connection which defines said single heat transfer fluid source and a second inlet connection for receiving heat transfer fluid for said second heat exchange means.

13. A valve assembly as set forth in claim 12 in which said means providing heat transfer fluid comprises a third external outlet connection for receiving heat transfer fluid from said arcuate heat exchange devices and a fourth outlet connection for receiving heat transfer fluid from said second heat exchange means.

14. A valve assembly as set forth in claim 13 in which said means providing heat transfer fluid comprises first conduit means having inlet means in flow communication with said first external inlet connection and outlet means in flow communication with said arcuate heat exchange devices.

15. A valve assembly as set forth in claim 14 in which said means providing heat transfer fluid comprises second conduit means having inlet means in flow communication with said arcuate heat exchange devices and outlet means in flow communication with said third outlet connection.

16. A valve assembly as set forth in claim 15 in which each of said inlet means and outlet means in flow communication with an associated arcuate heat exchange device is defined by an inlet bore and an outlet bore respectively in said body structure with each of said inlet bore and outlet bore extending perpendicularly through an associated outside surface of said body structure.

17. A valve assembly as set forth in claim 16 in which said first and second conduit means comprises a first and a second pipe system respectively disposed externally of said body structure.

18. A valve assembly as set forth in claim 17 in which each of said first and second pipe systems comprises cooperating pipes, fittings, and connectors.

19. In a method of making a butterfly valve assembly comprising the steps of, providing a valve body structure having a fluid flow passage therethrough and first sealing surface means, providing a closure structure for controlling fluid flow through said passage, said closure structure having second sealing surface means adapted to engage said first sealing surface means to prevent fluid flow through said passage and define the closed position of said closure structure, providing means for mounting said body structure on a supporting flange therefor, fastening shaft means to said closure structure and extending said shaft means through said body structure in fluid-tight relation, providing actuating means for moving said shaft means and closure structure between said closed position and an open position thereof, providing first substantially annular heat exchange means in said body structure for controlling the temperature of a major portion of said body structure, said first heat exchange means comprising the outer periphery of said body structure and having practically the entire valve assembly within the confines thereof, said first heat exchange means comprising a pair of arcuate heat exchange devices each having a separate fluid flow channel adapted to receive a heat transfer fluid therethrough, said pair of arcuate heat exchange devices serving to control said temperature of said major portion of said body structure and also the temperature of said first sealing surface means, said first heat exchange devices having opposite ends in close proximity to said shaft means, each of said heat exchange devices having an undulating innermost surface comprising said body structure and a substantially semicylindrical outer surface disposed concentrically therearound with said innermost and outer surfaces of each heat exchange device defining opposed surfaces of its associated flow channel, each of said undulating surfaces being effective in providing a turbulent action and more efficient heat transfer therethrough to said body structure, providing second substantially annular heat exchange means in said closure structure, said second heat exchange means being adapted to receive a heat transfer fluid therethrough for controlling the temperature of the outer portion of said closure structure and also the temperature of said second sealing surface means thereof, and providing means which provide heat transfer fluid through said first and second heat exchange means, the improvement wherein said step of providing means which provide heat transfer fluid comprises the step of providing a single heat transfer fluid source for both of said arcuate heat exchange devices of said first heat exchange means.

* * * * *